(12) United States Patent
Baduge et al.

(10) Patent No.: US 9,184,928 B2
(45) Date of Patent: Nov. 10, 2015

(54) COMMUNICATIONS TERMINAL, COMMUNICATIONS METHOD, AND PROGRAM AND INTEGRATED CIRCUIT FOR CONTROLLING A REPRODUCTION DELAY TIME IN DISTRIBUTING A STREAM

(75) Inventors: Thilmee Malinda Baduge, Osaka (JP); Eiichi Muramoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 886 days.

(21) Appl. No.: 13/392,898

(22) PCT Filed: May 17, 2011

(86) PCT No.: PCT/JP2011/002727
§ 371 (c)(1),
(2), (4) Date: Feb. 28, 2012

(87) PCT Pub. No.: WO2012/001866
PCT Pub. Date: Jan. 5, 2012

(65) Prior Publication Data
US 2012/0158818 A1 Jun. 21, 2012

(30) Foreign Application Priority Data
Jun. 28, 2010 (JP) ................................ 2010-146958

(51) Int. Cl.
*G06F 15/16* (2006.01)
*H04L 12/18* (2006.01)
*H04N 21/6405* (2011.01)

(52) U.S. Cl.
CPC ........ *H04L 12/1854* (2013.01); *H04L 12/1868* (2013.01); *H04N 21/6405* (2013.01)

(58) Field of Classification Search
CPC ........... H04L 12/1854; H04L 12/1868; H04N 21/6405
USPC .......... 709/201–203, 223–224; 370/400–401; 714/746–749
See application file for complete search history.

(56) References Cited

U.S. PATENT DOCUMENTS 6,718,361 B1 * 4/2004 Basani ................ H04L 67/1095 709/201
7,855,979 B2 * 12/2010 Yanagihara ................... 370/254
(Continued)

FOREIGN PATENT DOCUMENTS

| CN | 1719894 | 1/2006 |
| CN | 101390347 | 3/2009 |

(Continued)

OTHER PUBLICATIONS

Chinese Office Action issued Sep. 30, 2014 for the corresponding Chinese patent application No. 201180003566.4 (with English translation).
(Continued)

*Primary Examiner* — Bharat N Barot
(74) *Attorney, Agent, or Firm* — Wenderoth, Lind & Ponack, L.L.P.

(57) ABSTRACT

A communication terminal (100) is one of communication terminals each having one parent terminal and zero or more child terminals. The communication terminals form an Application Layer Multicast (ALM) tree to sequentially distribute retransmission data of stream data from the parent terminal to the child terminal. The communications terminal (100) includes: a reproduction delay time determining unit (1010) determining a reproduction delay time based on a longest round-trip delay time among round-trip delay times of sections between a root terminal and the communications terminal (100), each of the round-trip delay times being required for transmission and reception of data through one of the sections between two neighboring terminals of the communications terminals on the ALM tree; and a reproduction control unit (1020) reproducing the stream data received from the root terminal, with the stream data delayed by the reproduction delay time determined by the reproduction delay time determining unit (1010).

12 Claims, 23 Drawing Sheets

(56) References Cited

U.S. PATENT DOCUMENTS

| | | | |
|---|---|---|---|
| 7,898,998 | B2 | 3/2011 | Yoneda et al. |
| 8,031,608 | B2 | 10/2011 | Muramoto et al. |
| 8,239,722 | B2 * | 8/2012 | Tada .................. H04L 1/18 714/749 |
| 8,259,724 | B2 | 9/2012 | Konishi et al. |
| 8,750,103 | B2 * | 6/2014 | Baduge .................. H04L 12/18 370/229 |
| 8,913,873 | B2 * | 12/2014 | Iwamoto ............ H04N 21/4325 386/248 |
| 2001/0004352 | A1 * | 6/2001 | Watanabe et al. ............. 370/252 |
| 2009/0116482 | A1 | 5/2009 | Yoneda et al. |
| 2010/0074113 | A1 | 3/2010 | Muramoto et al. |
| 2010/0077273 | A1 * | 3/2010 | Tada .................. H04L 1/18 714/748 |
| 2010/0183012 | A1 | 7/2010 | Konishi et al. |
| 2013/0159475 | A1 * | 6/2013 | Baduge ............. H04N 21/6405 709/219 |

FOREIGN PATENT DOCUMENTS

| | | |
|---|---|---|
| CN | 101523825 | 9/2009 |
| JP | 2007-150859 | 6/2007 |
| WO | 2009/008181 | 1/2009 |
| WO | 2009/014222 | 1/2009 |

OTHER PUBLICATIONS

Hiroshi Hayakawa et al., "Proposal and Evaluation of Multicast Tree Changeable Retransmission—Retransmission Method between Brothers, Retransmission Method between a Root and Nodes-", The institute of electronics, information and communication engineers, vol. 108, No. 279, Oct. 30, 2008, pp. 37-40 (with English Abstract).

International Search Report issued Aug. 16, 2011 in International (PCT) Application No. PCT/JP2011/002727.

G. Tan et al., "Improving the Fault Resilience of Overlay Multicast for Media Streaming", IEEE Transactions on Parallel and Distributed Systems, vol. 18, Issue: 6, Jun. 2007, pp. 721-734.

G. Nakamura et al., "Streaming Playback Control Algorithm of Peer-to-Peer Multicast", The Institute of Electronics, Information and Communication Engineers, vol. 104, No. 692, Feb. 25, 2005, pp. 307-312.

Hiroshi Hayakawa et al., "Proposal and Evaluation of Multicast Tree Changeable Retransmission—Retransmission Method between Brothers, Retramission Method between a Root and Nodes-", The institute of electronics, information and communication engineers, vol. 108, No. 279, Oct. 30, 2008, pp. 37-40 (with English Abstract).

* cited by examiner

FIG. 5

| Terminal number | RTT between parent terminal and terminal | Value set for reproduction delay time | | | |
|---|---|---|---|---|---|
| | | Technique 1 | Technique 2 (Multiple number = 2) | Technique 3 | |
| | | | | $a_n$ | Set value |
| 20 | N/A | N/A | N/A | | N/A |
| 21 | 200 ms | 200 ms | 400 ms | 2 | 400 ms |
| 22 | 100 ms | 100 ms | 200 ms | 2 | 200 ms |
| 23 | 100 ms | 200 ms | 400 ms | 1 | 400 ms |
| 24 | 125 ms | 200 ms | 400 ms | 3 | 650 ms |
| 25 | 300 ms | 300 ms | 600 ms | 1 | 300 ms |
| 26 | 150 ms | 150 ms | 300 ms | 1 | 200 ms |
| 27 | 100 ms | 200 ms | 400 ms | 2 | 500 ms |
| 28 | 180 ms | 200 ms | 400 ms | 1 | 400 ms |
| 29 | 100 ms | 200 ms | 400 ms | 1 | 650 ms |
| 30 | 125 ms | 200 ms | 400 ms | 1 | 650 ms |
| 31 | 100 ms | 300 ms | 600 ms | 2 | 400 ms |
| 32 | 100 ms | 300 ms | 600 ms | 2 | 400 ms |
| 33 | 150 ms | 150 ms | 300 ms | 3 | 500 ms |
| 34 | 175 ms | 175 ms | 350 ms | 2 | 375 ms |

FIG. 10

| Terminal number | Message ID of RTT notification message | RTT included in RTT notification message |
|---|---|---|
| 20 | m1, m2 | N/A |
| 21 | m3, m4 | R (20, 21) |
| 22 | m5, m5 | R (20, 22) |
| 23 | m7, m8 | R (20, 21), R (21, 23) |
| 24 | m9, m10 | R (20, 21), R (21, 24) |
| 25 | m11, m12 | R (20, 22), R (22, 25) |
| 26 | m13, m14 | R (20, 22), R (22, 26) |
| 27 | ⋮ | R (20, 21), R(21, 23), R (23, 27) |
| 28 | ⋮ | R (20, 21), R(21, 23), R (23, 28) |
| 29 | ⋮ | R (20, 21), R(21, 24), R (24, 29) |
| 30 | ⋮ | R (20, 21), R(21, 24), R (24, 30) |
| 31 | ⋮ | R (20, 22), R(22, 25), R (25, 30) |
| 32 | ⋮ | R (20, 22), R(22, 25), R (25, 32) |
| 33 | ⋮ | R (20, 22), R(22, 25), R (25, 33) |
| 34 | ⋮ | R (20, 22), R(22, 25), R (25, 34) |

R (x, y) : RTT between terminals x and y

FIG. 23

| Terminal number | Environment having equal delay | | Environment having unequal delay | |
|---|---|---|---|---|
| | Network delay | Reproduction delay time | Network delay | Reproduction delay time |
| 20 | N/A | N/A | N/A | N/A |
| 21 | 100 ms | 200 ms | 200 ms | 400 ms |
| 23 | 100 ms | 200 ms | 100 ms | 200 ms |
| 27 | 100 ms | 200 ms | 100 ms | 200 ms |

COMMUNICATIONS TERMINAL, COMMUNICATIONS METHOD, AND PROGRAM AND INTEGRATED CIRCUIT FOR CONTROLLING A REPRODUCTION DELAY TIME IN DISTRIBUTING A STREAM

TECHNICAL FIELD

The present disclosure relates to a communications terminal and a communications method for controlling a reproduction delay time in distributing a stream via an Application Layer Multicast (ALM) tree.

BACKGROUND OF INVENTION

Background Art

In image data (packet) transmission and reception between a transmitting terminal 11 and a receiving terminal 12 on the Internet, an image data loss (packet loss) could occur as shown in FIG. 12. Such an image data loss inevitably causes the receiving terminal 12 to reproduce jittering images and audios. In order to prevent the jittery images and audios from occurring, the lost packet needs to be retransmitted to the transmitting terminal 11.

Thus, as shown in FIG. 13, the receiving terminal 12 requests the transmitting terminal 11 to retransmit a lost image packet (p2). In response to the request from the receiving terminal 12, the transmitting terminal 11 usually retransmits the corresponding packet (p2), as shown in FIG. 14.

To reproduce the retransmitted image packet (p2) on the receiving terminal 12, it is necessary to set a reproduction start time of the image packet (p2) on the receiving terminal 12, taking into consideration of a time period required for the retransmission. Specifically, as shown in FIG. 15, the start of the reproduction needs to be delayed for 1RTT from the original estimated arrival time of the image packet (p2). Here, the Round Trip Time (RTT) is a time period required for a packet to reciprocate between the receiving terminal 12 and the transmitting terminal 11.

The time period between the original estimated arrival time and the reproduction start time is usually referred to as a reproduction delay time. In a one-on-one communication shown in FIGS. 11 to 15, the reproduction delay time is usually set according to an RTT between the transmitting and the receiving terminals. For example, the reproduction delay time is set to be either (i) a multiple of the RTT or (ii) equal to or greater than the RTT.

Stream distribution via an ALM tree is one of the common techniques to simultaneously distribute image data to multiple terminals. Described below is an outline of the ALM tree, with reference to FIGS. 16 and 17. As shown in FIG. 16, terminals 11 to 17 are connected to a star network 10, such as the Internet and a Local Area Network (LAN).

Here consider, for example, the case where the terminal 11 tries to distribute stream data directly to all the other terminals 12 to 17: This would cause the stream data amount to exceed the upper limit of the bandwidth of a line connected to the terminal 11, resulting in delay in the stream data distribution.

Thus, as shown in FIG. 17, a logically hierarchical structure is constructed to have the terminal 11; namely the distribution source of the stream data, allocated as the topmost node (root terminal). In other words, the terminal 11 distributes the stream data only to the terminals 12 and 13. Each of the terminals 12 and 13 reproduces the stream data received from the terminal 11 as well as distributes the stream data to the terminals 14 and 15, and 16 and 17 which are lower in the level. The above construction makes possible dispersing the traffic, which contributes to delay-free stream distribution.

The reproduction delay time should also be taken into consideration when images are distributed via the ALM tree as described above. Similar to the one-on-one communication, the reproduction delay time may be set according to the RTT of the retransmission data between the transmission source terminal and the receiving terminal. Described below is how to retransmit image data when the image data is lost between terminals 21 and 23 in an ALM tree including 15 terminals; namely terminals 20 to 34 shown in FIGS. 18 to 20.

The first technique involves retransmission of the lost data from the root terminal (distribution source) of the ALM tree. Specifically, as shown in FIG. 18, the terminal 23 requests (shown in a chain line) the terminal 20; namely the root terminal, to retransmit the lost data. In response to the retransmission request sent from the terminal 23, the terminal 20 transmits retransmission data (shown in a broken line) to the terminal 23.

The second technique involves retransmission of the lost data from the parent terminal of a terminal; that is the parent terminal of a terminal on the tree. Specifically, as shown in FIG. 19, the terminal 23 requests (shown in a chain line) the terminal 21; namely the parent terminal, to retransmit the lost data. In response to the retransmission request sent from the terminals 23, the terminal 21 transmits retransmission data (shown in a broken line) to the terminal 23.

The third technique involves retransmission of the lost data from the third terminal other than the above terminals; that is, another terminal than the root terminal or the parent terminal. Specifically, as shown in FIG. 20, the terminal 23 requests (shown in a chain line) the terminal 22 to retransmit the lost data. Here, the terminal 23 has no relation of connection with the terminal 22 on the ALM tree. In response to the retransmission request sent from the terminals 23, the terminal 22 transmits retransmission data (shown in a broken line) to the terminal 23.

When the first retransmission technique is employed, the RTT for setting the reference reproduction delay time is the RTT between the terminal 23 and the terminal 20; namely, the root terminal. When the second retransmission technique is employed, the RTT for setting the reference reproduction delay time is the RTT between the terminal 23 and the terminal 21 that is the parent terminal. When the third retransmission technique is employed, the RTT for setting the reference reproduction delay time is the RTT between the terminal 23 and the terminal 22 that is the third terminal.

In contrast, in Non Patent Literature, each terminal has a fixed reproduction delay time, ignoring the RTT of retransmission data between a receiving terminal and a transmission source terminal. However, this technique causes deterioration in communications quality. Since this technique ignores the actual delay between the terminals, the following problems develops: The reproduction delay time is set either too short that the lost image data is reproduced with its jitter unremoved or too long that the reproduction start time delays excessively.

CITATION LIST

Non Patent Literature

[NPL 1]
Improving the Fault Resilience of Overlay Multicast for Media Streaming Tan, G.; Jarvis, S. A.; Parallel and Distributed Systems, IEEE Transactions on Volume: 18, Issue: 6

Digital Object Identifier: 10.1109/TPDS.2007.1054 Publication Year: 2007, Page(s): 721-734

SUMMARY OF INVENTION

As described above, in using the ALM tree, the RTT between the terminal and the retransmission data transmission source may be taken into consideration to set reproduction delay time, such that, in most cases, transmission quality improves. In the case where delays are different with each other between the terminals when this technique is applied to one of the second and the third techniques, however, the differences could develop a problem in that the resulting transmission quality would be lower than expected. With reference to FIGS. 21 to 23, the above problem is detailed below, comparing the cases where the delay between each terminal is (i) equal (FIG. 21) and (ii) not equal.

FIGS. 21 and 22 shows how data travels through the route on the ALM tree shown in FIG. 19 as time advances in the order of the terminals the terminals 20, 21, 23, and 27. Specifically, FIG. 21 in shows an environment in which the network delays between the terminals are equal with each other (hereinafter referred to as an environment having equal delay), and FIG. 22 shows an environment in which the network delays between the terminals are not equal with each other (hereinafter referred to as an environment having unequal delay). Here, the network delay is, for example, a time required for transmitting one packet from a parent terminal to a child terminal on the ALM tree. A typical network delay, is one half of an RTT. Hereinafter, an RTT is twice as long as a network delay.

Furthermore, a packet "p" is lost between the terminals 20 and 21 in any given cases. As shown in FIG. 23, moreover, the network delay is 100 ms between each terminal under the environment having equal delay. Meanwhile, under the environment having unequal delay, the network delay between the terminals 20 and 21 is 200 ms, and the network delay between each of the terminal other than the terminals 20 and 21 is 100 ms. In any case, the reproduction delay time between each of the terminals 21 to 34 is set to be equal to the RTT between each of the terminals 21 to 34 and a corresponding parent terminal (a source terminal of the retransmission data). In other words, the reproduction delay time is set twice as long as the network delay. In any case, the above second retransmission technique is employed to retransmit the lost data.

In the case where the packet "p" is lost between the terminals 20 and 21, the lost packet "p" will not arrive at either the terminal 21 or neither of the downstream terminals 23 nor 27. Thus, in the second retransmission technique, each of the terminals 21, 23, and 27 transmits a retransmission request of the packet "p" to a corresponding one of the parent terminals when the estimated arrival time of the packet "p" elapses. In response, the parent terminals retransmit the packet "p" to the corresponding terminals. The temporal flow of the operations is described first in the environment having equal delay (FIG. 21) and then the environment having unequal delay (FIG. 22).

In the environment having equal delay in FIG. 21, the terminals 20, 21, and 23 receive a retransmission request from the terminals 21, 23, and 27, respectively. Then, the terminals 20, 21, and 23 retransmit the packet "p" to the corresponding terminals 21, 23, and 27. In other words, 200 ms (=1RTT) after the transmission of the retransmission request (in other words after the elapse of the estimated arrival time of the packet "p"), the terminals 21, 23, and 27 receives the retransmitted packet "p". Moreover, as shown in FIG. 23, the reproduction delay time of the terminals 21, 23, and 27 is 200 ms. Thus, the packet "p" is reproduced with the image uninterrupted on each of the terminals 21, 23, and 27 (the retransmission of the packet "p" is in time for the reproduction on each of the terminals 21, 23, and 27).

Meanwhile, in the environment having unequal delay shown in FIG. 22, the network delay between the terminals 20 and 21 is 200 ms. Thus, the retransmission packet from the terminal 20 arrives at the terminal 21 400 ms after the original estimated arrival time of the packet "p". In other words, it takes 400 ms for the terminal 21 to retransmit the packet "p" to the terminal 23 (the retransmission request of the terminal 23 waits for 200 ms at the terminal 21). Thus, it is 400 ms after the original estimated arrival time that the retransmitted packet "p" arrives at the terminal 23. As shown in FIG. 23, the reproduction delay time of the terminal 23 is 200 ms. When the packet "p" arrives at the terminal 23, the reproduction start time has already passed (same as the terminal 27).

In the case where the network delays between the terminals are different with each other when the second retransmission technique is applied, the differences could develop a problem in that the resulting transmission quality would be lower than expected. Described here is only the case where the second retransmission technique is applied; meanwhile, the same problem develops when the third retransmission technique is applied.

It is noted that when the first retransmission technique is applied, the above problem will not occur since the first retransmission technique involves directly receiving the retransmission data from the root terminal, and is not influenced by the differences of delays between other terminals. The first retransmission technique, however, is not practical since the first transmission technique causes an increase in the number of the retransmission requests to be transmitted to the root terminal in proportion to the number of reception nodes, which inevitably deteriorates the processing capacity of the root terminal and develops strain on the bandwidth.

The present disclosure is conceived in view of the above problems and has an object to provide a communications terminal and a communications method which are capable of reproducing stream data in high quality, even though the stream data is lost on the transmission path.

A communications terminal according to an aspect of the present invention is one of communications terminals which receive stream data distributed from a root terminal and reproduce the stream data. Each of the communications terminals has one parent terminal and zero or more child terminals, such that the communication terminals form an ALM tree to sequentially transmit retransmission data of the stream data from the parent terminal to the child terminal. The communications terminal includes: a reproduction delay time determining unit which determines a reproduction delay time based on a longest round-trip delay time among round-trip delay times of sections between the root terminal and the communications terminal, each of the round-trip delay times being required for transmission and reception of data through one of the sections between two neighboring terminals of the communications terminals on the ALM tree; and a reproduction control unit which reproduces the stream data received from the root terminal, with the stream data delayed by the reproduction delay time determined by the reproduction delay time determining unit.

The above structure allows the retransmission data to be obtained by a reproduction time, even though the stream data is lost in the section, among the sections between the root terminal and the terminal, whose round-trip delay time is the longest; that is the section where it takes most time for retransmission processing. As a result, the communications terminal successfully reproduces the stream data with high quality.

In the above structure, it is noted that the retransmission data is transmitted through the ALM tree. Concurrently, a technique for transmitting the stream data shall not be limited in particular. For example, the stream data may be transmitted through: the same ALM tree as the retransmission data is transmitted, or an ALM tree which is different from the ALM tree through which the retransmission data is transmitted. Instead of the ALM tree, the stream data may also be directly transmitted from the root terminal to each of the communications terminals. Moreover, "the parent terminal" in Description is a transmission source terminal which directly transmits the data to the terminal on the ALM tree. On the ALM tree, "the child terminal" is a transmission target terminal to which the terminal directly transmits the data.

As an example, the reproduction delay time determining unit may determine, as the reproduction delay time, an integral multiple of the longest round-trip delay time.

As another example, when a round-trip delay time between the communications terminal and the parent terminal is defined as rtt(self), the reproduction delay time of the communications terminal is defined as x(self), the reproduction delay time of the parent terminal is defined as x(parent), and a positive integer is defined as $\alpha_{self}$, the reproduction delay time determining unit may determine (i) the reproduction delay time x(self) by means of Expression 1 if rtt(self)≥x (parent) is satisfied and (ii) the reproduction delay time by means of Expression 2 if rtt(self)<x(parent) is satisfied:

[Math. 1]

$$X(\text{self})=\alpha_{self} \times rtt(\text{self}) \quad \text{Expression 1}$$

[Math. 2]

$$X(\text{self})=(\alpha_{self}-1) \times rtt(\text{self})+x(\text{parent}) \quad \text{Expression 2}$$

Even though the retransmission data is lost, the use of each of the above techniques for determining the reproduction delay time makes it possible to obtain retransmission data by a reproduction time. As a result, the communications terminal successfully reproduces the stream data with higher quality.

Moreover, the communications terminal may include a retransmission requesting unit which, when part of the stream data received from the root terminal is lost, requests the parent terminal to transmit retransmission data corresponding to the loss. The retransmission request unit may repeatedly request the parent terminal to transmit the retransmission data at an interval which is (i) equal to or longer than the round-trip delay time between the communications terminal and the parent terminal and (ii) equal to or shorter than the longest round-trip delay time. This structure further allows the communications apparatus to enhance the ability of obtaining the retransmission data by a reproduction time.

Furthermore, the communications terminal may include: a round-trip delay time measuring unit which measures the round-trip delay time between the communications terminal and the parent terminal; and a round-trip delay time managing unit which (i) receives, from the parent terminal, a round-trip delay time notification including one or more of the round-trip delay times between the root terminal and the parent terminal on the ALM tree and (ii) transmits, to the child terminal, the received round-trip delay time notification together with the round-trip delay time measured by the round-trip delay time measuring unit. This structure allows important information (the round-trip delay time) to be distributed to each of the communications terminals, minimizing the traffic of the communications network.

In addition, the round-trip delay time managing unit may receive the round-trip delay time notification at predetermined time intervals. The round-trip delay time measuring unit may measure the round-trip delay time between the communications terminal and the parent terminal at each reception of the round-trip delay time notification. At each reception of the round-trip delay time notification, the reproduction delay time determining unit may determine the reproduction delay time based on the one or more round-trip delay times included in the round-trip delay time notification and the round-trip delay time measured by the round-trip delay time measuring unit. The communications terminals updates the reproduction delay time at predetermined time intervals, contributing to reproduction of the stream data with higher quality.

A communications terminal according to another aspect of the present invention is one of communications terminals which receive stream data distributed from a root terminal and reproduce the stream data. Each of the communications terminals has one parent terminal and zero or more child terminals, such that the communication terminals form an ALM tree to sequentially transmit retransmission data of the stream data from the parent terminal to the child terminal. The communications terminal includes: a reproduction delay time determining unit which determines a reproduction delay time based on a round-trip delay time of which section, among sections between the root terminal and the communications terminal, has a greatest loss rate of the stream data, each of round-trip delay times being required for transmission and reception of data through one of the sections between two neighboring terminals of the communications terminals on the ALM tree; and a reproduction control unit which reproduces the stream data, with the stream data delayed, upon reception of the stream data, by the reproduction delay time determined by the reproduction delay time determining unit.

As structured above, the communications terminal successfully reproduce the stream data with higher quality, by determining the reproduction delay time according to the loss rate of the stream data in each of the sections based on the round-trip delay time whose section has the greatest loss rate.

Furthermore, the communications terminal may include: a loss rate measuring unit which measures the loss rate between the communications terminal and the parent terminal; and a loss rate managing unit which (i) receives, from the parent terminal, a loss rate notification including one or more loss rates between the root terminal and the parent terminal on the ALM tree and (ii) transmits, to the child terminal, the loss rate notification together with the loss late measured by the loss rate measuring unit.

The loss rate managing unit may receive the loss rate notification at predetermined time intervals. The loss rate measuring unit may measure the loss rate between the communications terminal and the parent terminal at each reception of the loss rate notification. At each reception of the loss rate notification, the reproduction delay time determining unit may determine the reproduction delay time based on the one or more loss rates included in the loss rate notification and the loss rate measured by the loss rate measuring unit.

A communications method according to another aspect of the present invention is executed by a communications terminal included in communications terminals which receive stream data distributed from a root terminal and reproduce the stream data. Each of the communications terminals has one parent terminal and zero or more child terminals, such that the communication terminals form an ALM tree to sequentially transmit retransmission data of the stream data from the parent terminal to the child terminal. The communications method includes: determining a reproduction delay time based on a longest round-trip delay time among round-trip delay times of sections between the root terminal and the communications terminal, each of the round-trip delay times being required for transmission and reception of data through one of the sections between two neighboring terminals of the communications terminals on the ALM tree; and reproducing the stream data received from the root terminal, with the stream data delayed by the reproduction delay time determined in said determining.

A program according to another aspect of the present invention is stored on a non-transitory computer-readable recording medium and executed by a communications terminal included in communications terminals which receive stream data distributed from a root terminal and reproduce the stream data. Each of the communications terminals has one parent terminal and zero or more child terminals, such that the communication terminals form an ALM tree to sequentially transmit retransmission data of the stream data from the parent terminal to the child terminal. The program causes the communications terminal to execute: determining a reproduction delay time based on a longest round-trip delay time among round-trip delay times of sections between the root terminal and the communications terminal, each of the round-trip delay times being required for transmission and reception of data through one of the sections between two neighboring terminals of the communications terminals on the ALM tree; and reproducing the stream data received from the root terminal, with the stream data delayed by the reproduction delay time determined in said determining.

An integrated circuit according to another aspect of the present invention is in a communications terminal included in communications terminals which receive stream data distributed from a root terminal and reproduce the stream data. Each of the communications terminals has one parent terminal and zero or more child terminals, such that the communication terminals form an ALM tree to sequentially transmit retransmission data of the stream data from the parent terminal to the child terminal. The integrated circuit includes: a reproduction delay time determining unit which determines a reproduction delay time based on a longest round-trip delay time among round-trip delay times of sections between the root terminal and the communications terminal, each of the round-trip delay times being required for transmission and reception of data through one of the sections between two neighboring terminals of the communications terminals on the ALM tree; and a reproduction control unit which reproduces the stream data received from the root terminal, with the stream data delayed by the reproduction delay time determined by the reproduction delay time determining unit.

The present invention successfully improves the quality of stream data including images and audios to be reproduced on each of reception terminals.

BRIEF DESCRIPTION OF DRAWINGS

FIG. 5 exemplifies reproduction delay times to be determined by techniques 1 to 3.

FIG. 10 exemplifies an RTT included in the RTT notification message.

FIG. 23 shows a typical diagram exemplifying a relationship between a network delay and a reproduction delay time.

DETAILED DESCRIPTION OF INVENTION

Detailed hereinafter are embodiments of the present invention, with reference to the drawings.
[Embodiment 1]

Figure 1:
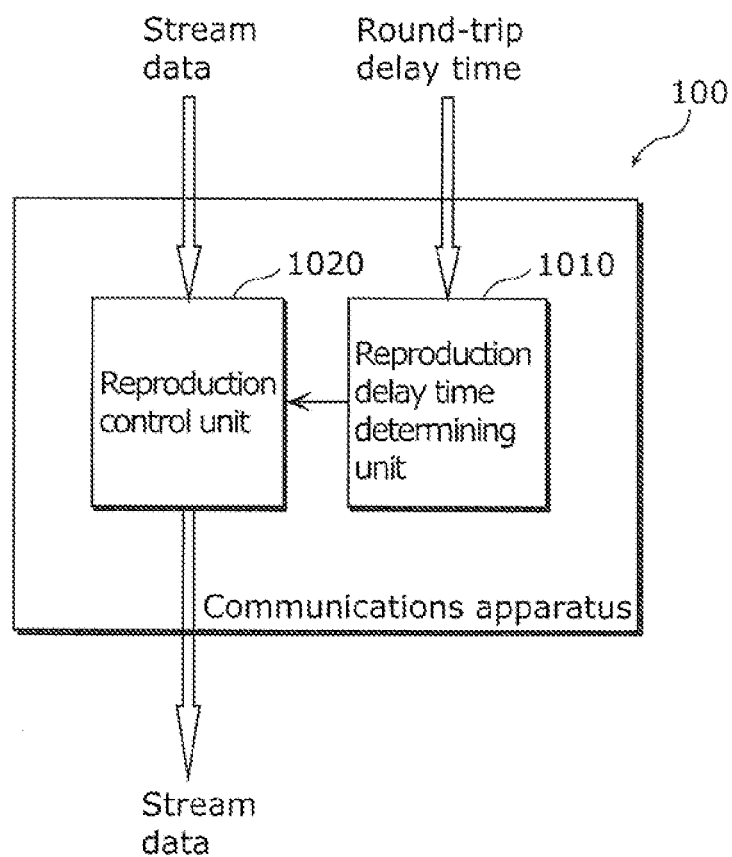
FIG. 1 depicts a functional block diagram of a communications terminal according to Embodiment 1.
Figure 2:
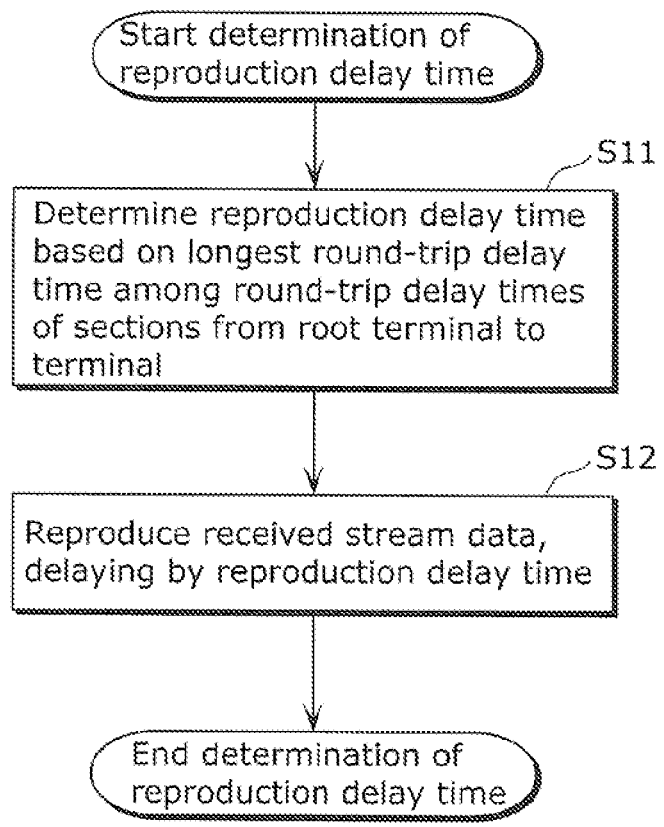
FIG. 2 shows a flowchart showing an operation of the communications terminal according to Embodiment 1.

Described hereinafter are a structure and an operation of a communications terminal 100 according to Embodiment 1 of the present invention, with reference to FIGS. 1 and 2. It is noted that FIG. 1 is a functional block diagram of the communications terminal 100. FIG. 2 is a flowchart showing the operation of the communications terminal 100.

As shown in FIG. 1, the communications terminal 100 according to Embodiment 1 includes a reproduction delay time determining unit 1010 and a reproduction control unit 1020. The communications terminal 100 is one of communications terminals (not shown in FIG. 1) each of which receives stream data distributed from a root terminal and reproduces the stream data. The communications terminals form an ALM tree. On the ALM tree, each of the communications terminals has one parent terminal and zero or more child terminals, so that the retransmission data of the stream data is sequentially transmitted from the parent terminal to the child terminal.

The reproduction delay time determining unit 1010 determines a reproduction delay time based on the longest round-trip delay time among round-trip delay times of the sections between the root terminal and the communications terminal 100 (S11). Here, each of the round-trip delay times is required for transmission and reception of data through one of the sections between two neighboring terminals of the communications terminals on the ALM tree. Typically, the round-trip delay time is equivalent to the RTT.

The reproduction control unit 1020 reproduces the stream data received from the root terminal, with the stream data delayed by the reproduction delay time determined by the reproduction delay time determining unit 1010 (S12). Specifically, the reproduction control unit 1020 once stores, in a buffer (not shown), the stream data received from the root terminal, reads the stream data from the buffer after the elapse of the reproduction delay time since the reception, and reproduces the stream data.

Figure 3:
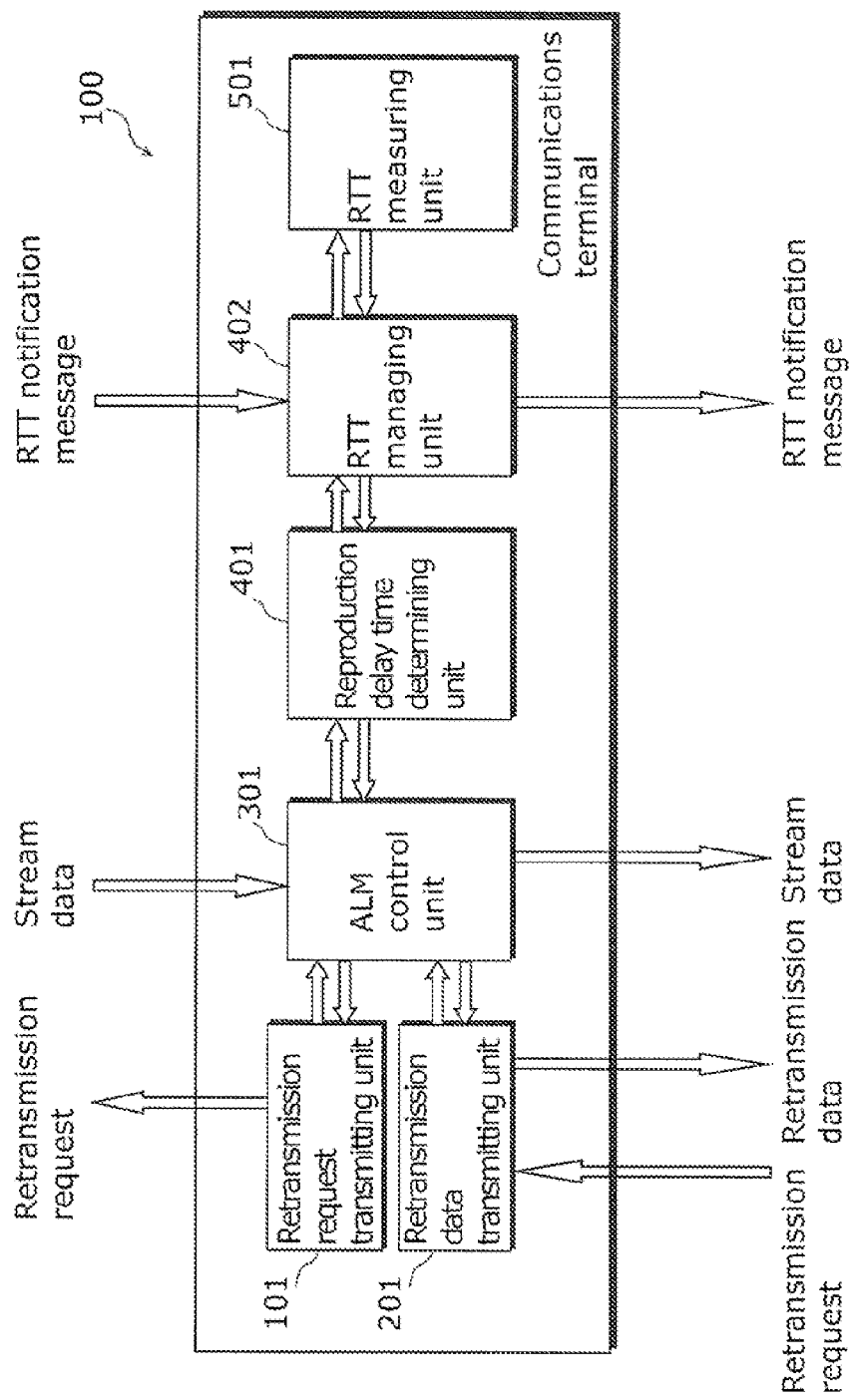
FIG. 3 depicts a detailed functional block diagram of the communications terminal according to Embodiment 1.

Detailed next is the structure of the communications terminal 100 according to Embodiment 1, with reference to FIG. 3. FIG. 3 is a detailed functional block diagram of the communications terminal 100. The communications terminal 100 shown in FIG. 3 includes a retransmission request transmitting unit 101, a retransmission data transmitting unit 201, an ALM control unit 301, a reproduction delay time determining unit 401, an RTT managing unit 402, and an RTT measuring unit 501. It is noted that the reproduction delay time determining unit 1010 and the reproduction control unit 1020 in FIG. 1 are respectively equivalent to the reproduction delay time determining unit 401 and the ALM control unit 301 in FIG. 3.

The ALM control unit (a reproduction control unit) 301 receives the stream data from a parent terminal on the ALM tree, and stores the received stream data in the buffer (not shown) as well as transmits the stream data to a child terminal. After the elapse of the reproduction delay time, the ALM control unit 301 also reproduces the stream data stored in the buffer.

The RTT measuring unit (a round-trip delay time measuring unit) 501 measures an RTT between the terminal and the parent terminal. The techniques to measure the RTT shall not be limited in particular. One of such techniques may be a typical RTT measuring technique employed in the Real-time Transport Control Protocol (RTCP).

The RTT managing unit (a round-trip delay time managing unit) 402 receives the RTT notification message (a round-trip delay time notification) from the parent terminal, and transmits, to the child terminal, the RU notification message together with the RTT (the round-trip delay time) between the terminal and the parent terminal. It is noted that the RTT notification message received from the parent terminal includes an RTT of each of the sections from the root terminal to the parent terminal on the ALM tree.

The reproduction delay time determining unit 401 determines the reproduction delay time based on (i) the RTT included in the RTT notification message received from the parent terminal by the RTT managing unit 402 and (ii) the RTT measured by the RTT measuring unit 501, and notifies the ALM control unit 301 of the determined reproduction delay time. Specific determination techniques shall be described later.

In the case where part of the stream data received from the root terminal is lost, the retransmission request transmitting unit (a retransmission requesting unit) 101 requests the parent terminal to retransmit the retransmission data corresponding to the loss. The retransmission request transmitting unit 101 repeatedly transmits the retransmission request until receiving the retransmission data. Here, an interval between retransmissions may preferably be (i) equal to or longer than the round-trip delay time between the communications terminal 100 and the parent terminal thereof, and (ii) equal to or shorter than the longest round-trip delay time among round-trip delay times of the sections lying from the root terminal to the terminal.

Upon receiving the retransmission request from the child terminal, the retransmission data transmitting unit 201 obtains the data indicated in the retransmission request sent from the buffer of the ALM control unit 301, and transmits the obtained data to the child terminal which is the transmission source of the retransmission request. In the case where there is no data to be retransmitted in the buffer of the ALM control unit 301, the retransmission data transmitting unit 201 stands by until receiving the data. Once receiving the retransmission data, the retransmission data transmitting unit 201 transmits the data as soon as possible.

Described next are specific techniques 1 to 3 showing how the communications terminal 100 determines the reproduction delay time, with reference to FIGS. 4 to 8. In order to simplify the description, FIGS. 4 to 8 show the second retransmission technique for transmitting and receiving the retransmission data. In other words, the stream data and the retransmission data are distributed via the same ALM tree.

It is noted that, in the technique 1, the longest RTT is the reproduction delay time among the RTTs between the terminals through which the retransmission data to the terminal travels. The technique 2 involves further multiplying the longest RTT in the technique 1 by an integer to obtain the reproduction delay time. The technique 3 involves setting the value, obtained based on the Expressions 1 and 2 below, as the reproduction delay time of the terminal. It is noted that "the terminals through which the retransmission data to the terminal travels" are all the terminals upstream (a path from the terminal to the root terminal) from the terminal.

Figure 4:
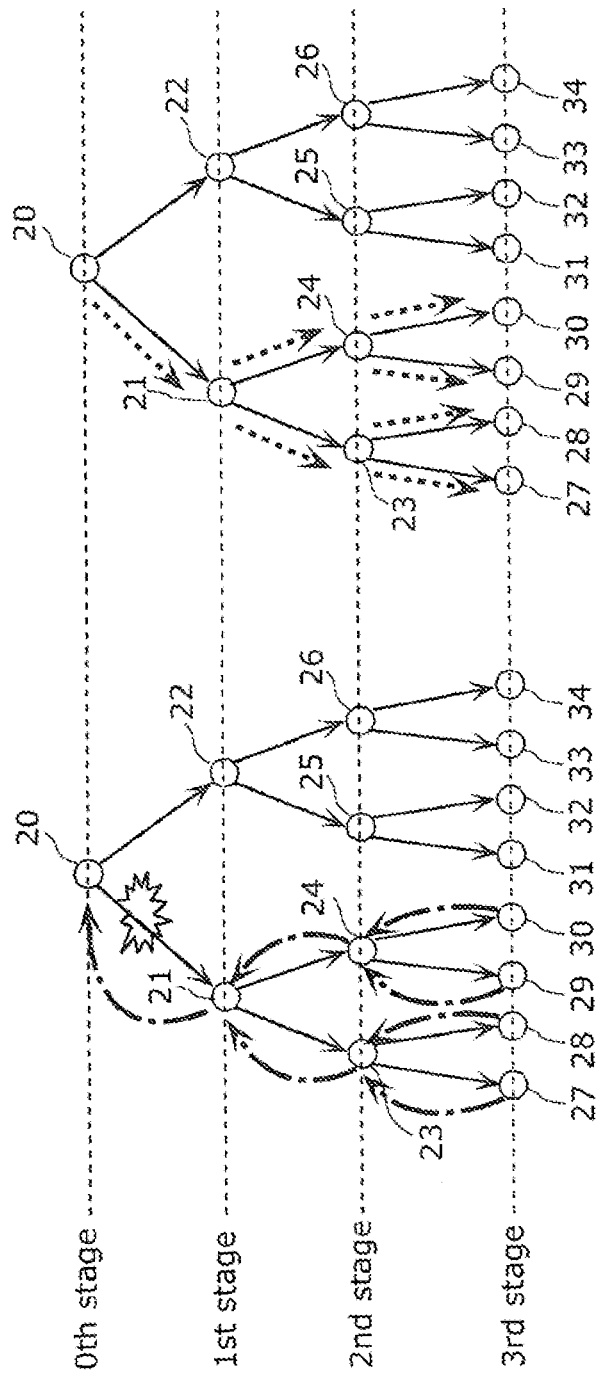
FIG. 4 exemplifies, on an ALM tree, a destination of a retransmission request (left) and a destination of retransmission data.

FIG. 4 exemplifies the retransmission by the parent terminal (the second retransmission technique), assuming that the data is lost between the terminals 20 and 21. Here, the data loss affects the terminal 21 and the downstream terminals; namely, the terminals 23, 24, and 27 to 30. Thus, the retransmission requests are transmitted as follows: from the terminal 21 to the terminal 20, from the terminals 23 and 24 to the terminal 21, from the terminals 27 and 28 to the terminal 23, and from the terminals 29 and 30 to the terminal 24 (See the left tree in FIG. 4). Furthermore, the terminals 20, 21, 23, and 24 receiving the retransmission requests transmit the retransmission data to the corresponding terminals which has requested the retransmission requests (See the right tree in FIG. 4).

Here, as the right tree in FIG. 4 clearly shows, the retransmission data to each of the terminals travels through each of the upstream terminals. In other words, in the case where a loss occurs in any given section on the tree (that is a communication path between neighboring two terminals), the retransmission data is expected to travel all the downstream terminals from the loss occurring section. The loss occurring section can be the top-most section including the root terminal. In such a case, the retransmission data travels through all the terminals forming the ALM tree.

First, in technique 1, the longest RTT among the RTTs in the upstream sections from each of the terminals is set as the reproduction delay time of each of the terminal. As shown in FIG. 5, specifically, the RTT between the terminals 20 and 21 is 200 ms. Thus, the reproduction delay time of the terminal 21 is 200 ms. The RTT between the terminals 21 and 23 is 100 ms. Thus, the reproduction delay time of the terminal 23 is 200 ms (the RTT between the terminals 20 and 21). Furthermore, the RTT between the terminals 23 and 27 is 100 ms.

Thus, the reproduction delay time of the terminal 27 is 200 ms (the RTT between the terminals 20 and 21). The same technique is employed to set the reproduction delay times for the other terminals 22, 24 to 26, and 28 to 34.

Figure 6:
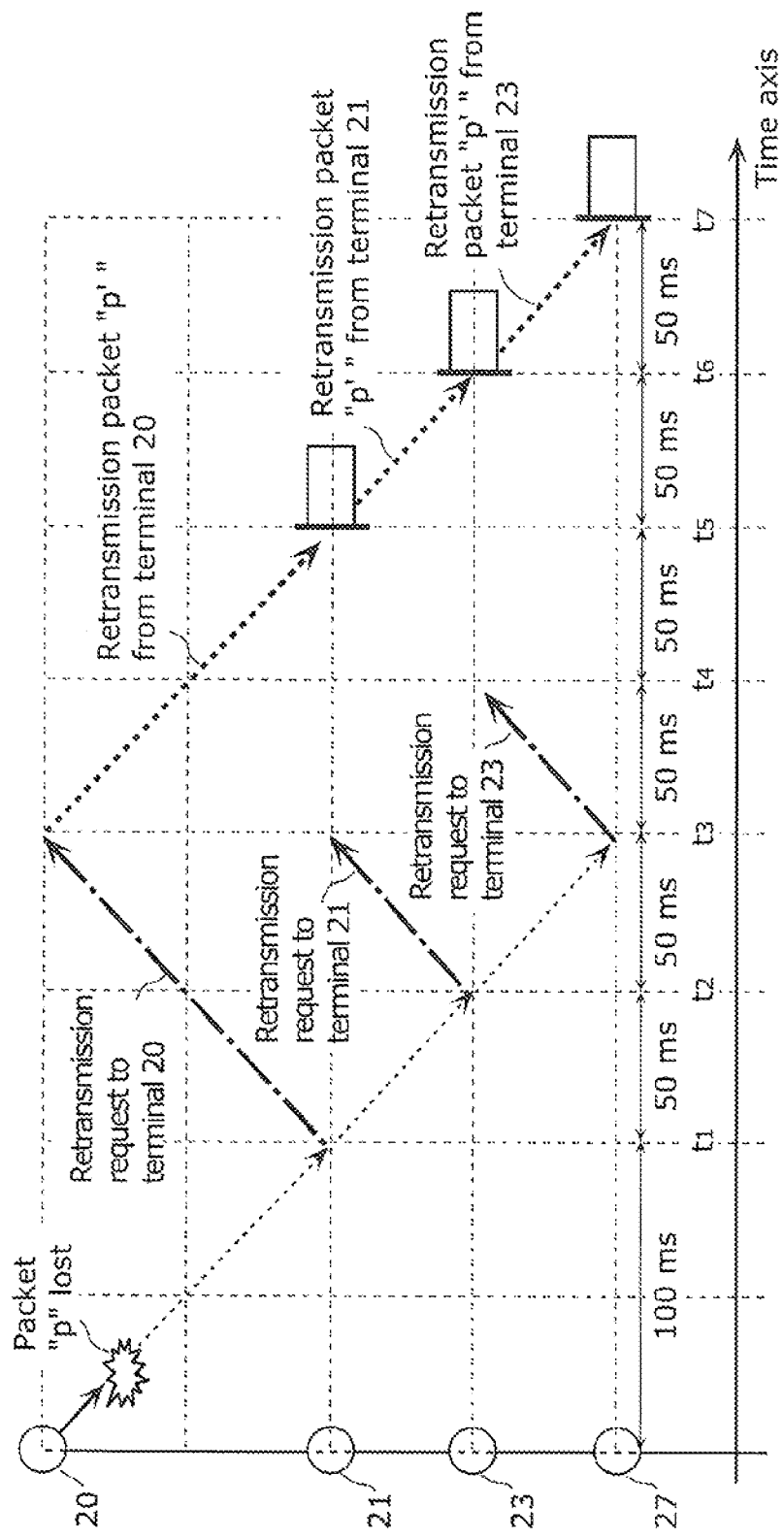
FIG. 6 exemplifies a data flow in the technique 1.

FIG. 6 shows a temporal shift of the retransmission process executed among the terminals 20, 21, 23, and 27 when the packet "p" is lost between the terminals 20 and 21.

According to FIG. 6, the packet "p" transmitted from the terminal 20 is expected to arrive at (i) the terminal 21 at the time $t_1$, 100 ms after the transmission from the terminal 20 (ii) the terminal 23 at the time $t_2$, 50 ms after the transmission from the terminal 21 and (iii) the terminal 27 at the time $t_3$, 50 ms after the transmission from the terminal 23. The loss of the packet "p" in the section between the terminals 20 and 21, however, prevents the terminals 21, 23, and 27 from receiving the packet "p" at the expected times.

Thus, the terminal 21 transmits the retransmission request to the terminal 20 at the time $t_1$. The retransmission request arrives at the terminal 20 at $t_3$, 100 ms after the transmission from the terminal 21. Similarly, the terminal 23 transmits the retransmission request to the terminal 21 at the time $t_2$. The terminal 27 transmits the retransmission request to the terminal 23 at the time $t_3$. Then, the retransmission request transmitted from the terminal 23 arrives at the terminal 21 in 50 ms at the time $t_3$. The retransmission request transmitted from the terminal 27 arrives at the terminal 23 in 50 ms at the time $t_4$.

Next, the terminal 20, which received the retransmission request from the terminal 21 at the time $t_3$, immediately transmits a retransmission packet "p'" to the terminal 21. The retransmission packet "p'" arrives at the terminal 21 at the time $t_5$, 100 ms after the transmission from the terminal 20.

The terminal 21, which received the retransmission request from the terminal 23 at the time $t_3$, does not have the packet "p" itself, and stands by as it is. Upon receiving the retransmission packet "p" from the terminal 20 at the time $t_5$, the terminal 21 transmits the retransmission packet "p" to the terminal 23 in response to the retransmission request. The retransmission packet "p" arrives at the terminal 23 at $t_6$, 50 ms after the transmission from the terminal 21.

The terminal 23, which received the retransmission request from the terminal 27 at the time $t_4$, does not have the packet "p" itself, and stands by as it is. Upon receiving the retransmission packet "p" from the terminal 21 at the time $t_6$, the terminal 23 transmits the retransmission packet "p" to the terminal 27 in response to the is retransmission request. The retransmission packet "p" arrives at the terminal 27 at the time $t_7$, 50 ms after the transmission from the terminal 23.

Since the reproduction delay time of each of the terminals 21, 23, and 27 is set to the RTT (=200 ms) between the terminals 20 and 21; that is, the longest RTT on the path through which the retransmission data travels, the retransmission data which arrives at the terminals 21, 23, and 27 is ready in time for the reproduction as FIG. 6 shows. It is noted that this is the case where the data is lost between the terminals 20 and 21; that is, the longest RTT section. In the case where the data is lost in another section (for example, the section between the terminals 21 and 23), the time to be required is shorter for the arrival of the retransmission data. In this case, as well, the retransmission data never fails to arrive at the terminals 23 and 27 for their reproduction.

The techniques 2 and 3 are devised so that each of the terminals further makes sure to receive the retransmission data. Specifically, the techniques 2 and 3 provide extra time to each of the terminals so that the lost retransmission data can be retransmitted again when the retransmission data itself is lost during the retransmission. For example, suppose no retransmission data arrives even though the reproduction delay time calculated by the technique 1 has elapsed since the transmission of the retransmission request. Here, the retransmission data is regarded lost on the way, and the retransmission request can be transmitted again. The techniques 2 and 3 involve setting the reproduction delay time of each of the terminals, so that a retransmission packet received as a response to the second retransmission request arrives at each of the to terminals in time for the reproduction. Hereinafter, the details of the above techniques are described in order.

In the technique 2, the reproduction delay time of the terminal is set to the integral multiple of the longest RTT of the upstream RTT. As shown in FIG. 5, for example, the reproduction delay time of each of the terminals 21 to 34 is set twice as long as the longest RTT (in other words, the reproduction delay time in the technique 1) of all of the upstream RTTs. Here, in the case where each of the terminals 21 to 34 continues to transmit the retransmission request at the interval of the longest RTT in the technique 1, one loss of the retransmission data can be overcome.

FIG. 6 shows a temporal shift of the process executed when the retransmission packet "p'" is lost. It is noted that detailed description shall be omitted for the same processing as that in the technique 1 in FIG. 6. Instead, the characteristic processing in the technique 2 shall be mainly described.

Figure 7:
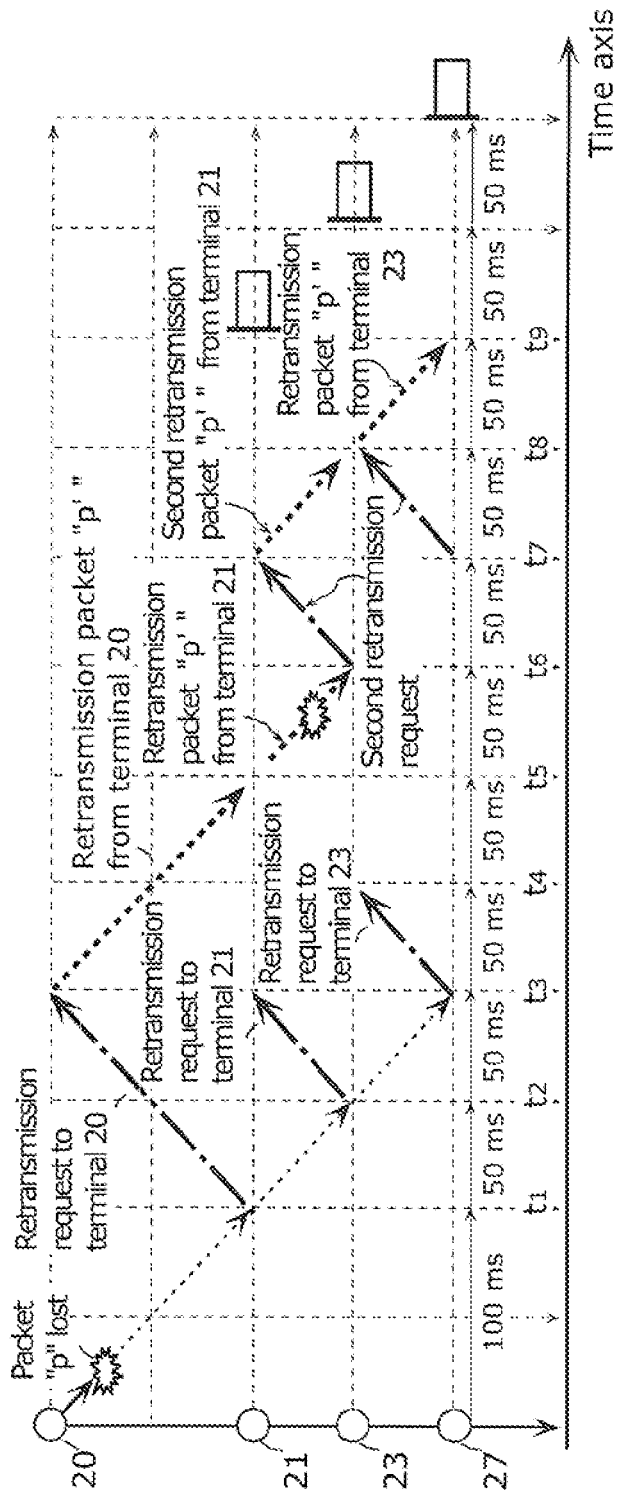
FIG. 7 exemplifies a data flow in the technique 2.

In addition to the example in FIG. 6, FIG. 7 exemplifies the case where, between the times $t_5$ and $t_6$, the retransmission packet "p'" is lost between the terminals 21 and 23. The terminals 23 and 27 continue to transmit the retransmission requests at the interval of 200 ms; that is, the longest upstream RTT. In other words, the terminal 23 transmits the second retransmission request to the terminal 21 at as the time $t_6$, 200 ms after the time $t_2$ which is the original estimated arrival time of the packet "p". Similarly, the terminal 27 transmits the second retransmission request to the terminal 23 at the time $t_6$, 200 ms after the time $t_3$ which is the original estimated arrival time of the packet "p".

The terminal 21 receives the second retransmission request from the terminal 23 at the time $t_7$, and transmits the retransmission packet "p" again to the terminal 23. Then, the retransmission packet "p" transmitted from the terminal 21 arrives at the terminal 23 300 ms after the original estimated arrival time $t_2$. Similarly, the terminal 23 receives the second retransmission request from the terminal 27 at the time $t_8$, and transmits the retransmission packet "p" again to the terminal 27. Then, the retransmission packet "p" transmitted from the terminal 23 arrives at the terminal 27 300 ms after the original estimated arrival time $t_3$.

Hence, the retransmission packet "p" arrives at the terminals 23 and 27 within 400 ms which is the reproduction delay time of the terminals 23 and 27. In other words, the retransmission packet "p" arrives at the terminals 23 and 27 in time for their reproduction.

The example in FIG. 7 shows that the retransmission packet "p" is lost on a link other than the longest RTT link (the section having the longest RTT), so that the retransmission packet "p" arrives before the reproduction delay time. In the case where the loss occurs on the longest RTT link, the retransmission packet "p" arrives 400 ms later. This is equal to the reproduction delay time, and is in time for the reproduction.

In the above example, the reproduction delay time (=the longest RTT) calculated in the technique 1 is multiplied by two. An increase in the reproduction delay time in three times, four times, . . . x times allows the terminals to operate in an unstable communication environment, such as causing more losses of the retransmission packet "p". Specifically, the terminals can overcome designated times (multiple number−1) of retransmission data losses.

It is noted that as the reproduction delay time becomes longer, the capacity of the buffer for temporarily storing the stream data needs to be larger. Thus, the value of x to be multiplied by the longest RTT may be determined, taking into consideration real-time processing of the stream data and stability of the communications network.

It is noted that the interval at which the retransmission request is kept transmitted is not always the longest RTT. Instead, the intervals may be any given upstream RTT. For example, the retransmission request may be kept transmitted at the interval of the RTT between the parent terminal and a terminal (the RTT between the terminals 21 and 23 when the terminal is 23, and the RTT between the terminals 23 and 27 when the terminal is 27).

The technique 2 employs an integral multiple of the longest RTT as the reproduction delay time so as to cope with the loss of the retransmission data on the longest RTT link. In contrast, the technique 3 is capable of individually setting the number of retransmissions $\alpha_n$ to each of the terminals n. Specifically, Expressions 1 and 2 are employed to determine a reproduction delay time x(n) of each of the terminals n.

[Math.3]

$$X(n) = \alpha_n \times rtt(n) \qquad \text{Expression 1}$$

[Math.4]

$$X(n) = (\alpha_n - 1) \times rtt(n) + x(\text{parent}) \qquad \text{Expression 2}$$

It is noted that, in Expression 1, the reproduction delay time at the terminal n is defined as x(n), the reproduction delay time of the parent terminal of the terminal n is defined as x(parent), the RTT between the terminal n and the parent terminal is defined as rtt(n), and a positive integer to be set for each terminal n is defined as $\alpha_n$. Expression 1 is employed if the condition 1: rtt(n)≥x(parent) is satisfied. Expression 2 is employed if the condition 2: rtt(n)<x(parent) is satisfied.

Specifically, the terminal 22 satisfies the condition 1 since RTT(22)=100 ms, and x(parent)=x(20)=0 ms. Thus, RTT(22)=100 ms and $\alpha_{22}$=2 are substituted to obtain the reproduction delay time x(22) of the terminal 22=200 ms. It is noted that the parent terminal of the terminal 22 is the terminal 20; namely the root terminal, and the data loss does not have to be considered. Thus, the reproduction delay time x(20) is 0 ms.

The terminal 25 satisfies the condition 1 since RTT(25)=300 ms, and x(parent)=x(22)=200 ms. Thus, RTT(25)=300 ms and $\alpha_{25}$=1 are substituted in the Expression 1 to obtain the reproduction delay time x(25) of the terminal 25 is 300 ms.

The terminal 31 satisfies the condition 2 since the RTT(31)=100 ms, and x(parent)=x(25)=300 ms. Thus, RTT (31)=100 ms, x(parent)=300 ms, and $\alpha_{31}$=2 are substituted in the Expression 2 to obtain the reproduction delay time x of the terminal 31=400 ms.

It is noted that the positive integer $\alpha_n$ in Expressions 1 and 2 shows that $\alpha_n$ times of retransmission are desired between the terminal n and the parent terminal. The value $\alpha_n$ can be set for each terminal n. As a result, the number of retransmission trials varies for each terminal. The columns of the technique 3 in FIG. 3 show (i) the number of retransmission trials $\alpha_n$ (=the number of retransmission trial from the parent terminal) for each terminal and (ii) the reproduction delay time of each terminal derived from the Expressions 1 and 2 when $\alpha_n$ is substituted.

Figure 8:
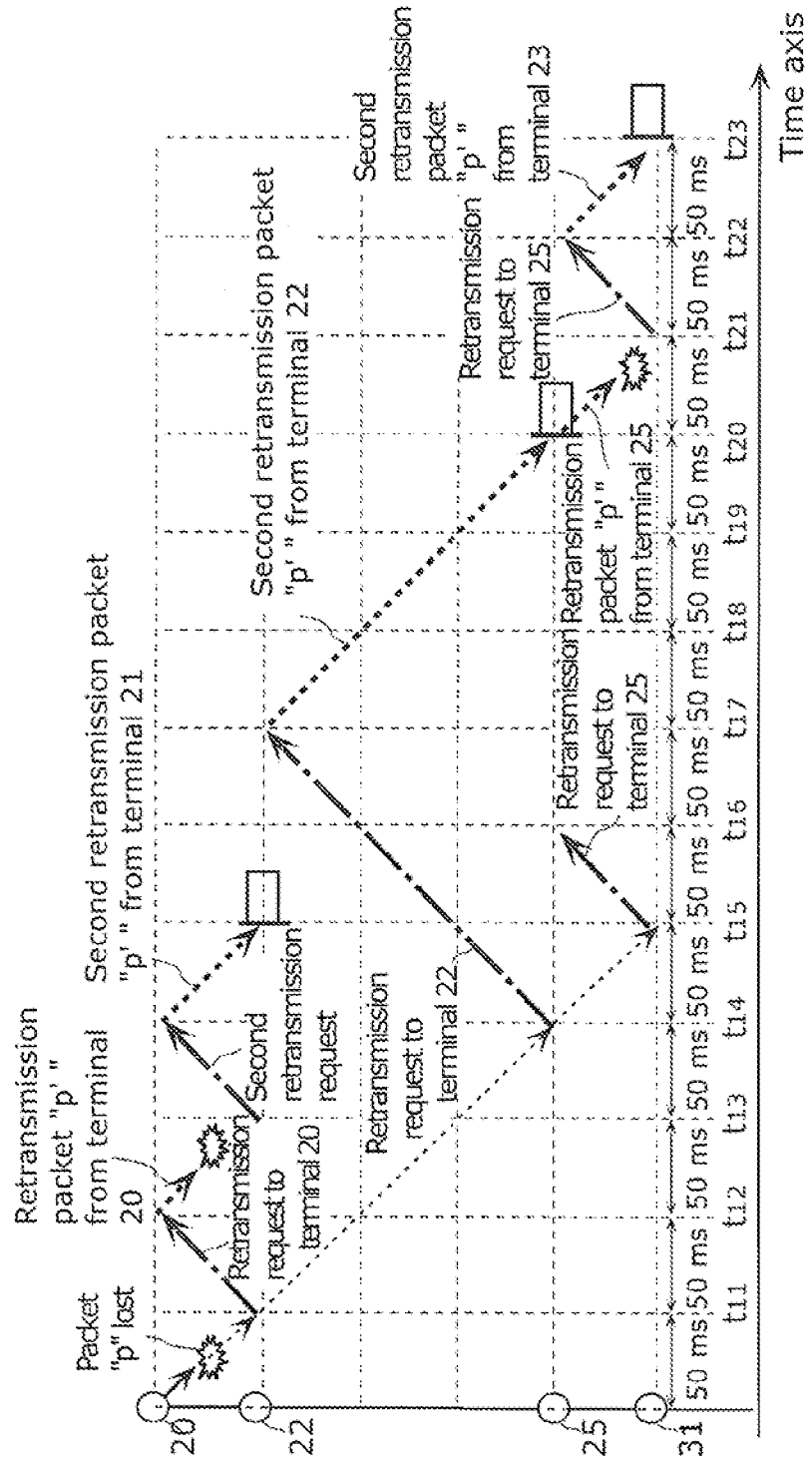
FIG. 8 exemplifies a data flow in the technique 3.

FIG. 8 shows a temporal shift of the processes on the terminals 20, 22, 25, and 31 when the technique 3 is employed. It is noted that each of the terminals 22, 25, and 31 is expected to continue to transmit the retransmission request at the interval of the longest RTT on the route of the retransmission data. In other words, the terminal 22 continues to transmit the retransmission request at the 100-ms interval, and the terminals 25 and 31 continue to transmit the retransmission request at the 300-ms interval.

As shown in FIG. 8, first, the terminal 22 transmits the retransmission request to the terminal 20 at (i) the arrival estimated time $t_{11}$ of the packet "p" and (ii) the time $t_{13}$, 100 ms after the time $t_{11}$. Then, in response to the second retransmission request, the terminal 22 receives the retransmission packet "p" from the terminal 20 at the time $t_{15}$, 200 ms after the original arrival estimated time $t_{11}$. Here, the terminal 22 has the reproduction delay time x(22) of 200 ms and the number of retransmission trials $\alpha_{22}$ is 2. Thus, in the case where the terminal 22 receives the retransmission packet "p'" at the time $t_{15}$ in response to the second retransmission request, the terminal 22 can reproduce the retransmission packet "p'" in time.

The terminal 25 transmits the retransmission request to the terminal 22 at the arrival estimated time $t_{14}$ of the packet "p". Then, in response to the first retransmission request, the terminal 25 receives the retransmission packet "p" from the terminal 22 at the time $t_{20}$, 300 ms after the original arrival estimated time $t_{14}$. Here, the terminal 25 has the reproduction delay time x(25) of 300 ms and the number of retransmission trials $\alpha_{25}$ is 1. Thus, in the case where the terminal 25 receives the retransmission packet "p'" at the time $t_{20}$ in response to the first retransmission request, the terminal 25 can reproduce the retransmission packet "p'" in time.

The terminal 31 transmits the retransmission request to the terminal 25 at (i) the arrival estimated time $t_{15}$ of the packet "p" and (ii) the time $t_{21}$, 300 ms after the time $t_{15}$. Then, in response to the second retransmission request, the terminal 31 receives the retransmission packet "p" from the terminal 25 at the time $t_{23}$, 400 ms after the original arrival estimated time $t_{15}$. Here, the terminal 31 has the reproduction delay time x(31) of 400 ms, and the number of retransmission trials $\alpha_{31}$ is 2. Thus, in the case where the terminal 31 receives the retransmission packet "p'" at the time $t_{23}$ in response to the second retransmission request, the terminal 31 can reproduce the retransmission packet "p'" in time.

Hence, even though the retransmission trials are executed for as many as $\alpha_n$ designated to each terminal; that is, even though the packet "p" and the packet "p'" are lost as many times as the packet "p" and the packet "p'" are recovered by the number of retransmission trials, the retransmission packet "p" arrives at each of the terminals in time for the reproduction time of each terminal.

It is noted that the interval at which the retransmission request continues to be transmitted is not always the longest RTT. Instead, the interval may be any given upstream RTT. For example, the retransmission request may continue to be transmitted at the interval of the RTT between the parent terminal and a child terminal (the RTT between the terminals 20 and 22 when the child terminal is 22, the RTT between the terminals 22 and 25 when the child terminal is 25, and the RTT between the terminals 25 and 31 when the child terminal is 31).

In the techniques 1 to 3, each of the terminals obtains a corresponding RTT on the route of the retransmission data, and independently calculates the reproduction delay time of the terminal. Instead, a specific terminal, such as the root terminal, may intensively calculate the RTTs and distribute the RTTs to corresponding terminals.

Described next is how to collect RTTs required for calculation of the above reproduction delay times, with reference to FIGS. 9 and 10. Here, the second retransmission technique is assumed in order to simplify the description. The required RTT for each of the terminals is only an RTT between upstream terminals from the terminal on the ALM tree.

Figure 9:
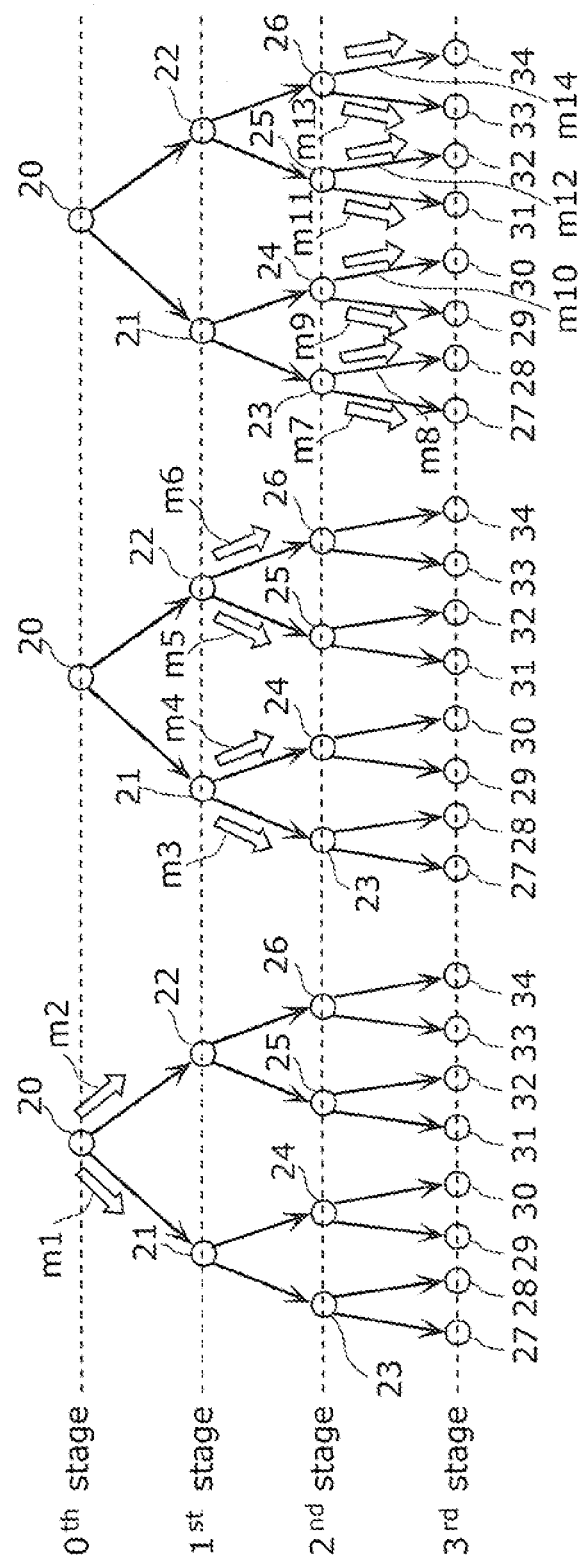
FIG. 9 shows a transmission sequence of an RTT notification message.

As shown in the tree on the far left in FIG. 9, the terminal 20; namely the root terminal, transmits RTT notification messages "m1" and "m2" to the terminals 21 and 22, respectively. Here, the terminal 20 has no parent terminal, and actually transmits the RTT notification messages "m1" and "m2" with no RTT information included.

Next, as shown in the middle tree in FIG. 9 and FIG. 10, the terminal 21 which has received the RTT notification message "m1" transmits to the terminals 23 and 24 new RTT notification messages "m3" and "m4" both including the RTT between the terminal 21 itself and the parent terminal (the terminal 20). Here, the RTT between the terminal 21 itself and the parent terminal is measured by the RTT measuring unit 501 in FIG. 1. Similarly, the terminal 22 which has received the RTT notification message "m2" transmits to the terminals 25 and 26 new RTT notification messages "m5" and "m6" both including the RTT between the terminal 22 itself and the parent terminal (the terminal 20).

The terminals 23 to 26, which receive the RTT notification messages, operate in the same manner as the terminals 21 and 22. As shown in the tree on the far right, the terminals 27 to 34 receive RTT notification messages "m7" to "m14". FIG. 10 shows the details (included RTTs) of each RTT notification message. Each terminal can calculate the reproduction delay time based on the details of the RTT notification message received from the parent terminal and the RTT between the terminal itself and the parent terminal. The RTT is calculated by each terminal itself. Here, a specific technique for measuring the RTT between the terminal and the parent terminal includes a typical RTT measuring technique employed in the RTCP, for example.

It is noted that the RTT notification message may additionally have extra information. For example, the RTT notification message may additionally include the reproduction delay time (required in the technique 3) determined at each terminal, and may be transmitted to a child terminal.

Here, the required RTT is obtained with a top-down approach (the process runs upstream to downstream) shown in FIG. 8. Instead, another approach may be employed, such that each terminal measures an RTT between the terminal itself and another terminal (hereinafter referred to as neighboring terminal) connected to the terminal, and the information of the RTT may be distributed among all the terminals.

Moreover, the following approach may be employed: Each terminal may (i) measure either the RTT between the terminal itself and the parent terminal or the RTT between the terminal itself and a neighboring terminal and (ii) notify the root terminal of the measured RTT individually or with the bottom-up approach (the process runs downstream to upstream), and the root terminal may notify each terminal of the required RTT individually or through the multicast on the tree. Furthermore, another collection technique other than the above may be employed.

It is noted that the above reproduction delay time determination process is executed only once when the streams data starts to be distributed. During the stream data distribution, the reproduction delay time may be fixed. The reproduction delay time determination process may also be repeated at predetermined time intervals, and the reproduction delay time may be updated during the stream data distribution.

Specifically, the RTT managing unit 402 receives the RTT notification message at predetermined time intervals. With respect to each reception of the RTT notification message by the RTT managing unit 402, the RTT measuring unit 501 measures the RTT between the terminal and the parent terminal. Then, at each reception of the RTT notification message, the reproduction delay time determining unit 401 may execute the reproduction delay time determination process, based on an RTT included in the RTT notification message and on an RU newly measured by the RTT measuring unit 501.

It is noted that when the reproduction delay time becomes shorter during the distribution of the stream data, however, the stream data which has already been held in the buffer needs to be fast-forwarded or skipped. When the reproduction delay time becomes longer during the distribution of the stream data, the reproduction of the stream data which has already been held in the buffer needs to be paused or the stream data needs to be slowly reproduced.

Such a change in the reproduction delay time during the distribution of the stream data can momentarily cause jitters on the reproduced images and audios. Constantly updating the reproduction delay time to the optimum one, however, will reduce the jitters on the images or on the audios on the whole. Thus, the reproduction delay time may preferably be updated at predetermined time intervals.

It is noted that the update intervals of the reproduction delay time may be changed, depending on the environment of a communications network. For example, brief update intervals may be provided when the communication environment is unstable, and long update intervals may be provided when the communication environment is stable.

Moreover, the update of the reproduction delay time may be restricted, depending on the characteristics of stream data. Following schemes may be applied, for example: When the stream data needs to be processed in real time (a TV conference, for example), the update is allowed only when the reproduction delay time becomes shorter, and when the stream data may not be interrupted (music, for example), the update is allowed only when the reproduction delay time becomes longer.

[Embodiment 2]

Described next is a structure and an operation of a communications terminal according to Embodiment 2. It is noted that the details shared between Embodiments 1 and 2 shall be omitted, and the differences may be mainly described. The communications terminal according to Embodiment 2 has the communications terminal 100 in FIG. 1 include a loss rate managing unit and a loss rate measuring unit. Furthermore, the reproduction delay time determining unit 401 in Embodiment 2 employs a technique of determining the reproduction delay time differs specifically different from that employed in Embodiment 1.

The loss rate measuring unit measures a loss rate of the stream data between a terminal and the parent terminal. Specifically, the loss rate measuring unit may calculate the Packet Error Rate (PER) of the received stream data with reference to the sequence number of the TCP header.

The loss rate managing unit receives, from the parent terminal, a loss rate notification including the loss rate of each section between the root terminal and the parent terminal on the ALM tree, adds the loss rate notification with the loss rate measured by the loss rate measuring unit, and transmits the loss late notification to a child terminal.

It is noted that the loss rate notification may be transmitted and received as the RTT notification message; that is, the loss rate notification may be transmitted and received as a separate message from the RTT notification message. Here, a specific process is the same as that of the RTT notification message by the RTT managing unit 402. The RTT notification message may also include information of the loss rate.

In addition to an RTT, the reproduction delay time determining unit according to Embodiment 2 determines a reproduction delay time based on (i) a loss rate included in the loss rate notification received by the loss rate managing unit and (ii) a loss rate measured by the loss rate measuring unit. Specifically, the reproduction delay time determining unit determines the reproduction delay time based on the RTT whose section, among the sections from the root terminal to the terminal, has the greatest loss rate of the data stream.

As described above, the reproduction delay time determining unit determines the reproduction delay time, taking into consideration the loss rate of each section, as well as the information of the RTTs on the route of the retransmission data. This operation contributes to further improvement in the quality of the stream data to be reproduced by the ALM control unit 301.

[Embodiment 3]

The present invention may be provided in a form of a program executed by a computer implementing communications methods in Embodiments 1 and 2, as well as the communications terminals and the communications methods in Embodiments 1 and 2.

Figure 11A:
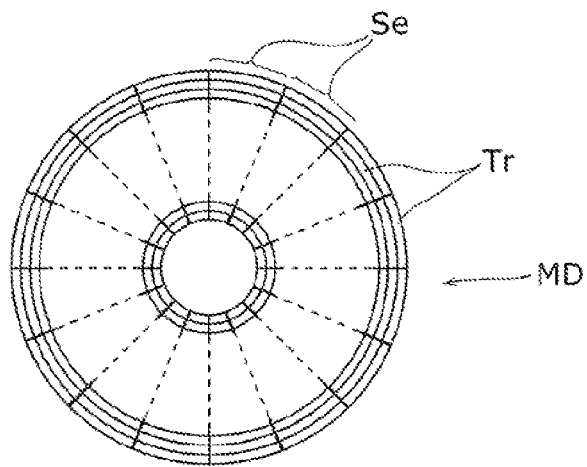
FIG. 11A shows a physical format of a magnetic disk used as a storage medium body.
Figure 11B:
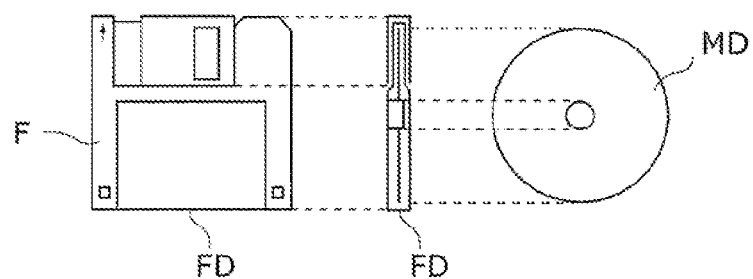
FIG. 11B shows the magnetic disk, and an elevated view and a cross-sectional view of a casing holding the magnetic disk.
Figure 11C:
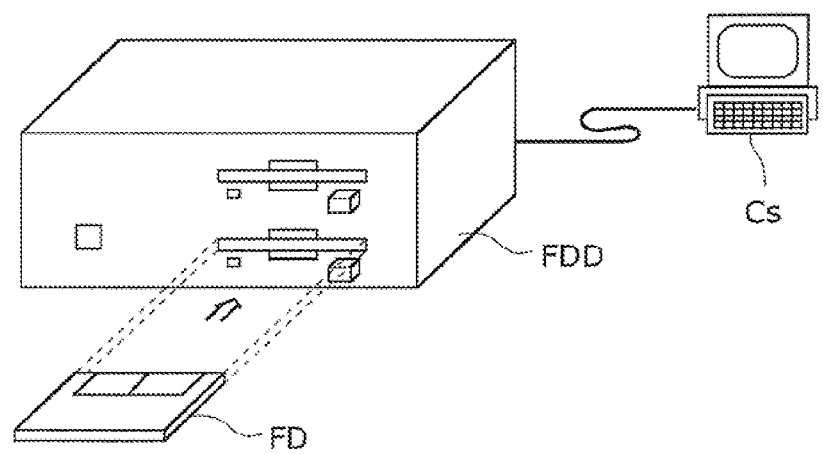
FIG. 11C shows how a program is stored on a flexible disk and is reproduced.
Figure 12:
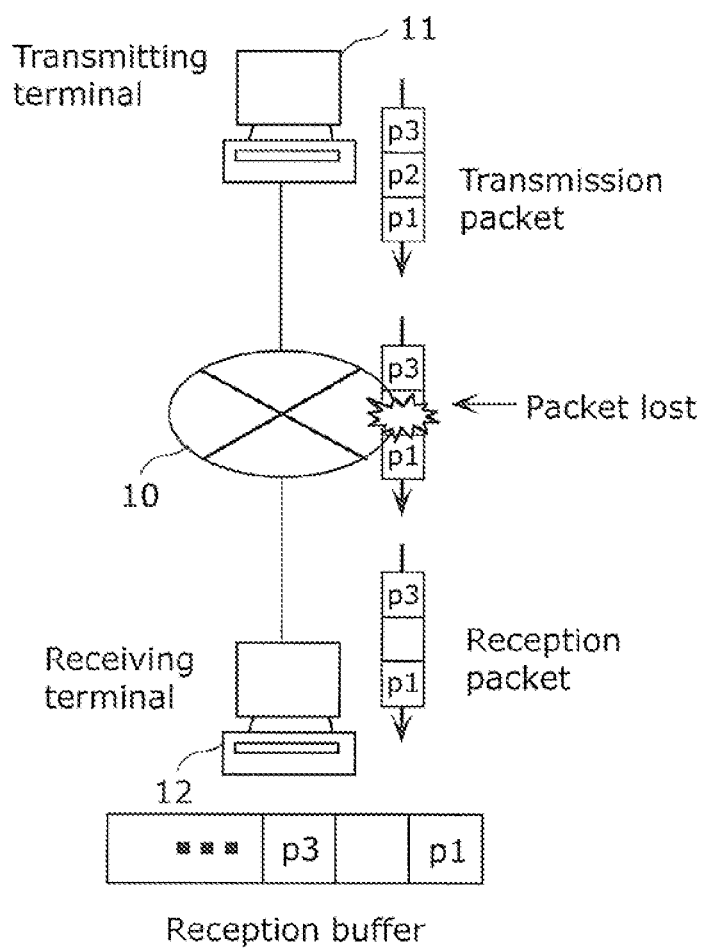
FIG. 12 exemplifies how a typical data loss develops on a communications network.
Figure 13:
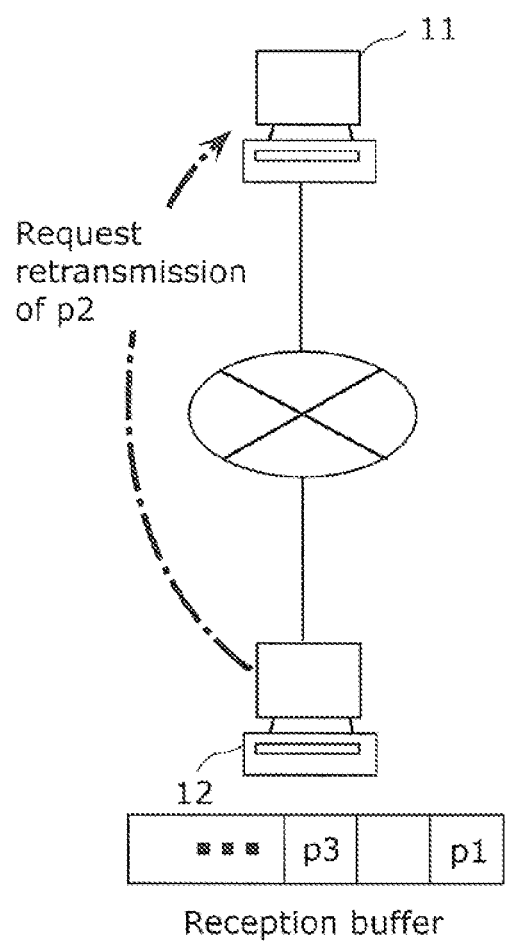
FIG. 13 exemplifies how to typically request retransmission of the lost data.
Figure 14:
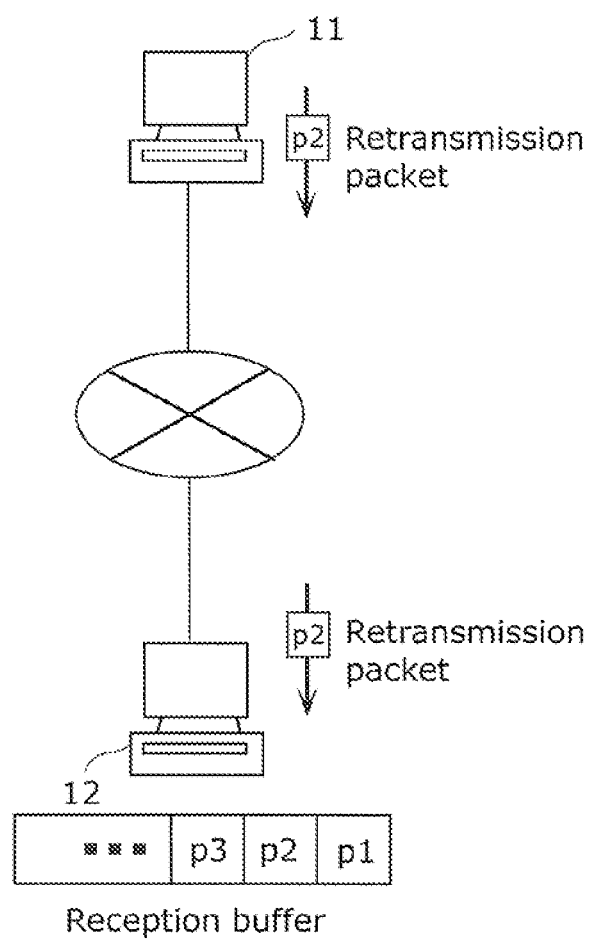
FIG. 14 exemplifies how to typically transmit retransmission data.
Figure 15:
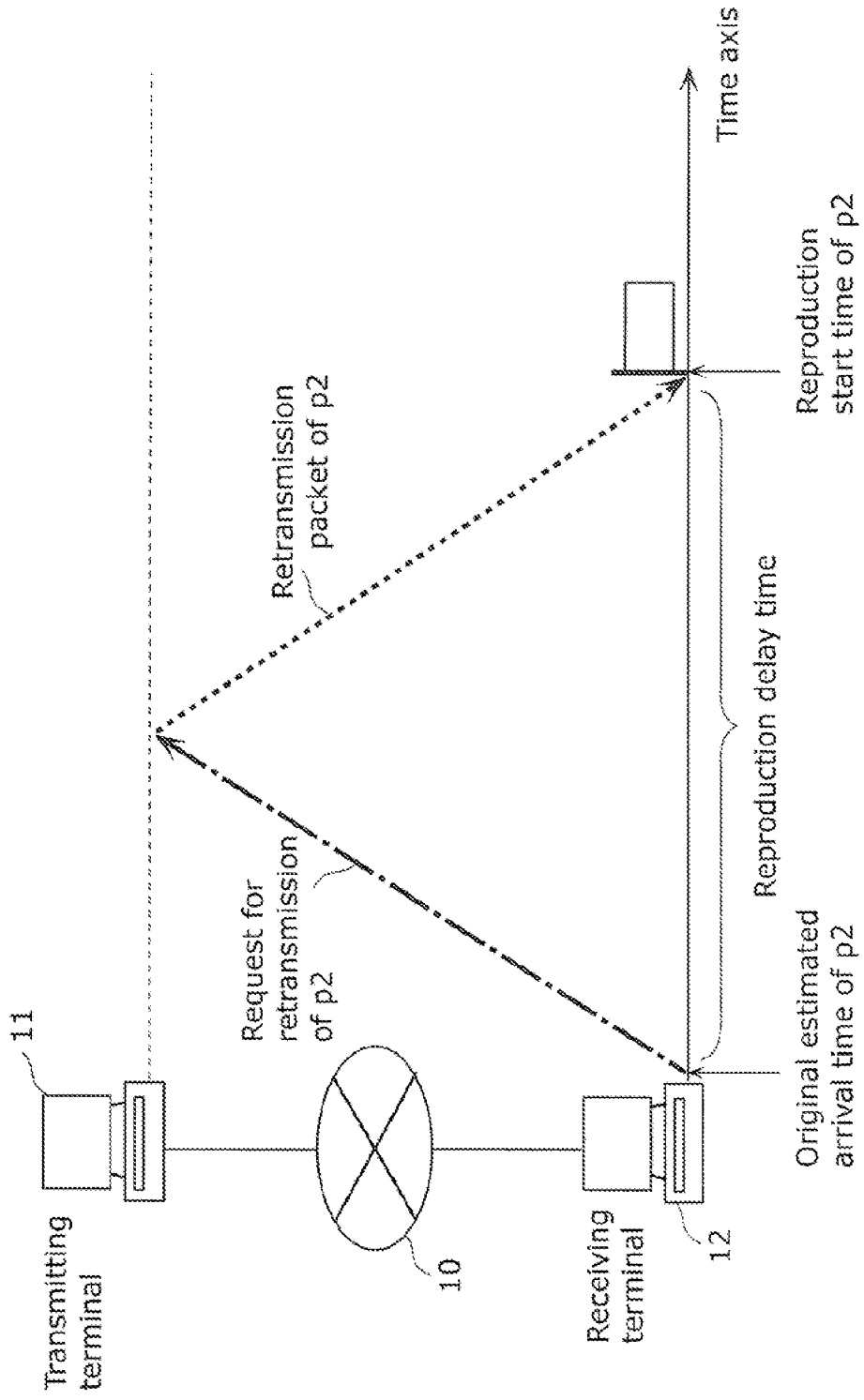
FIG. 15 exemplifies how to typically determine a retransmission delay time.
Figure 16:
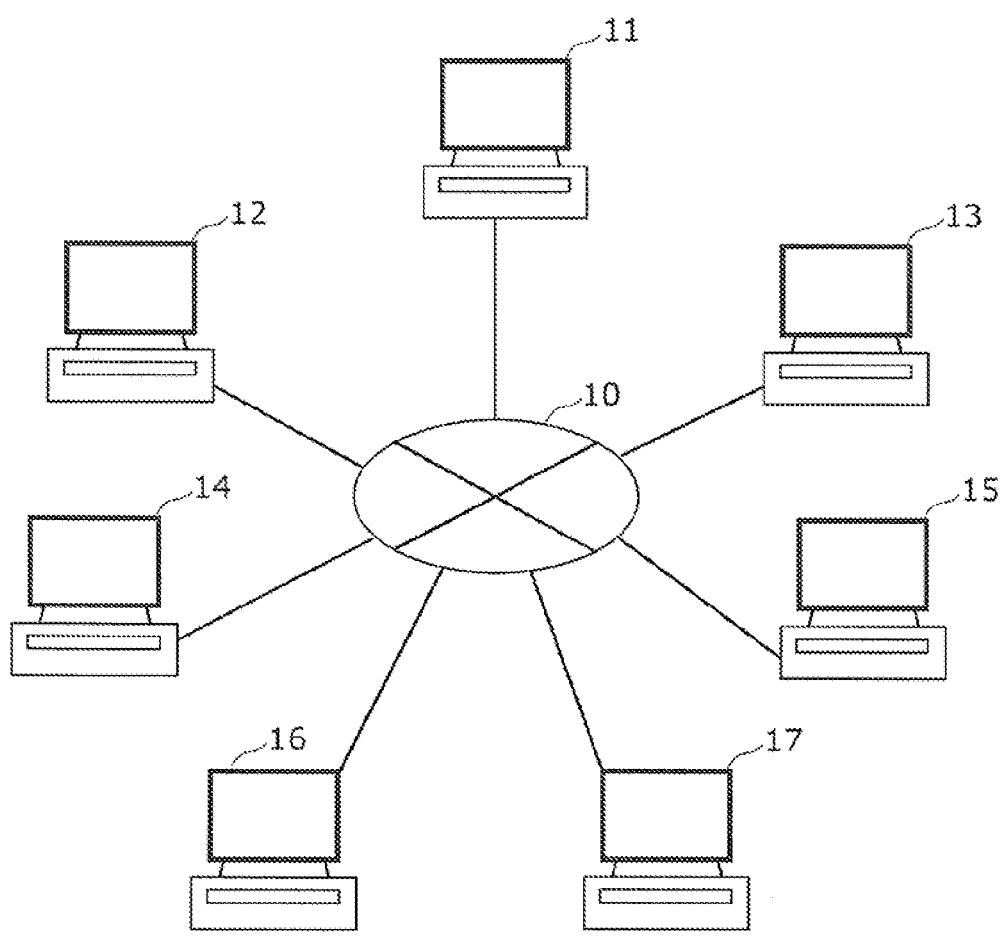
FIG. 16 shows a conventional network configuration.
Figure 17:
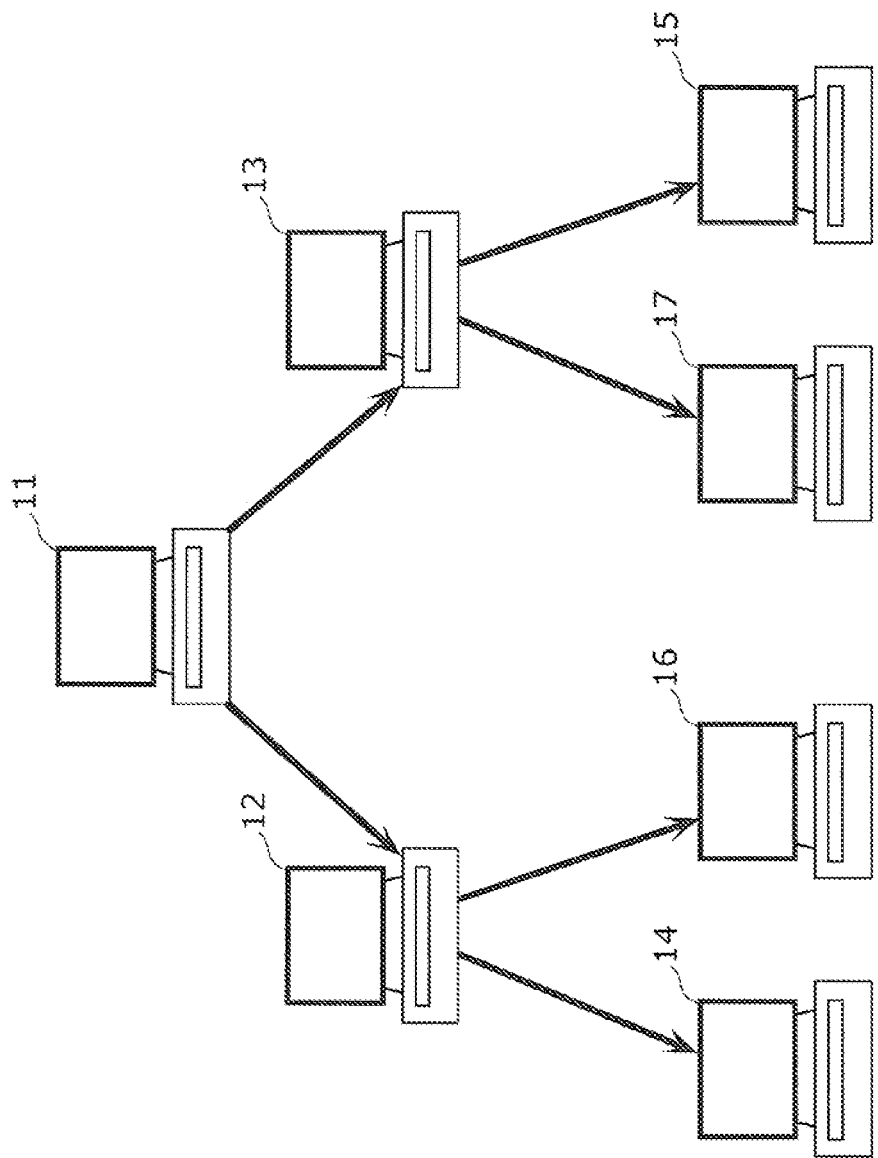
FIG. 17 shows a typical example of an ALM tree formed of the terminals of FIG. 16.
Figure 18:
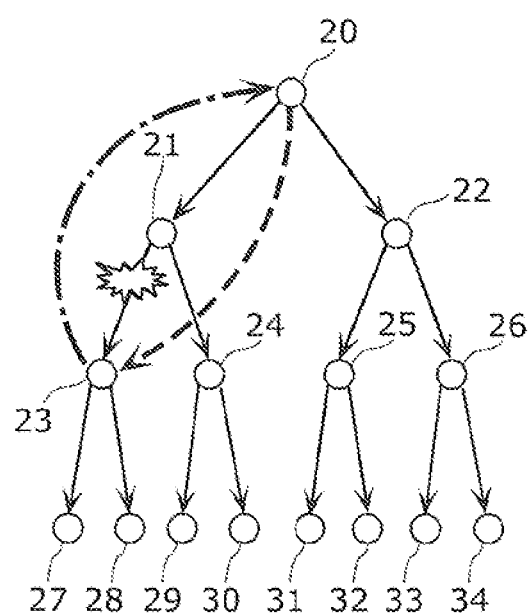
FIG. 18 shows a typical diagram showing a first data retransmission technique.
Figure 19:
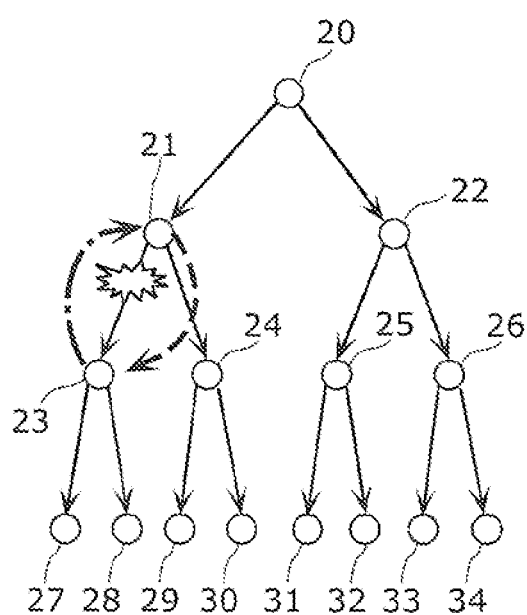
FIG. 19 shows a typical diagram showing a second data retransmission technique.
Figure 20:
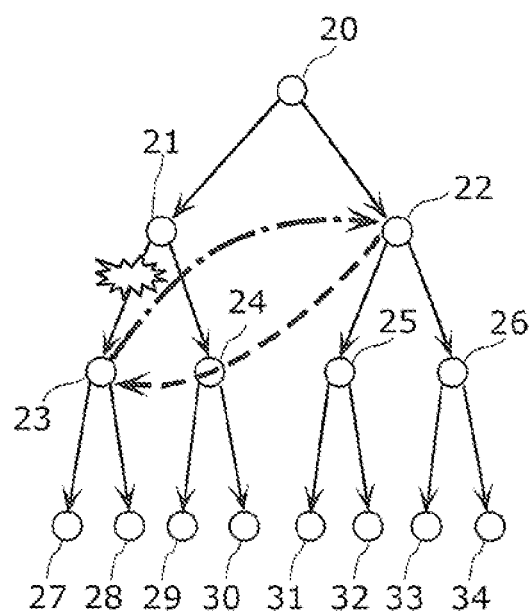
FIG. 20 shows a typical diagram showing a third data retransmission technique.
Figure 21:
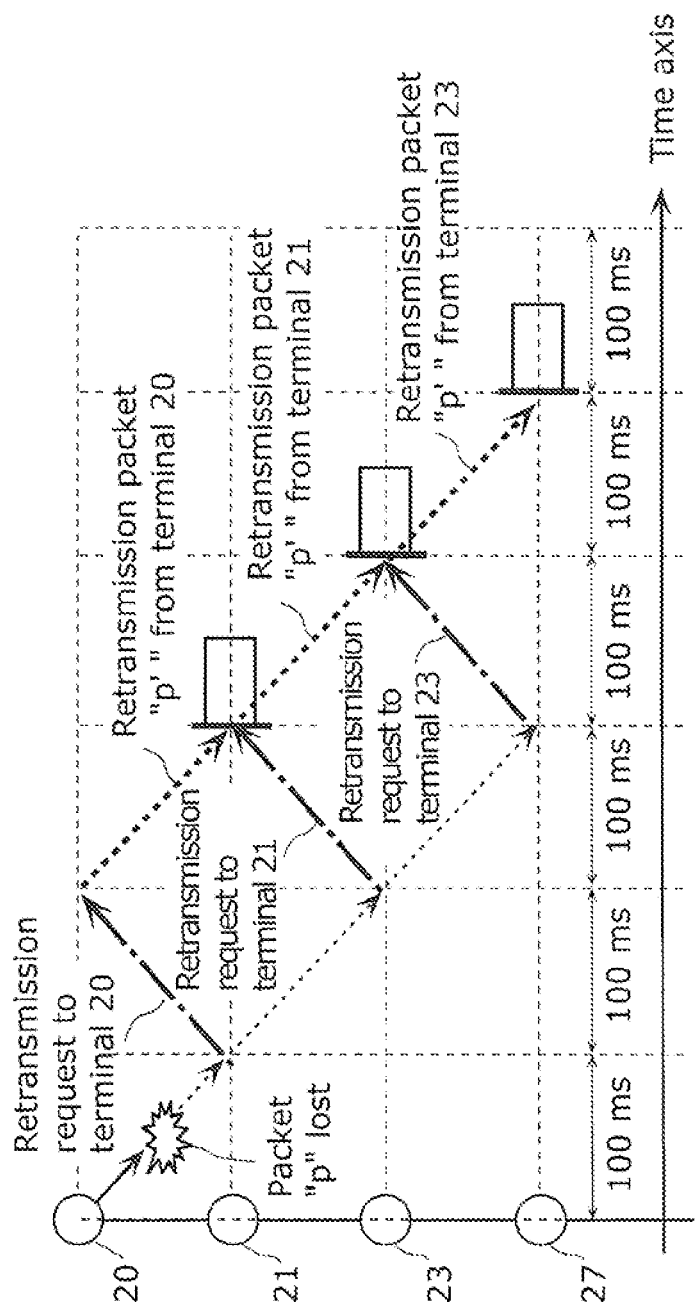
FIG. 21 shows a typical diagram exemplifying a retransmission processing flow under an environment having equal delay.
Figure 22:
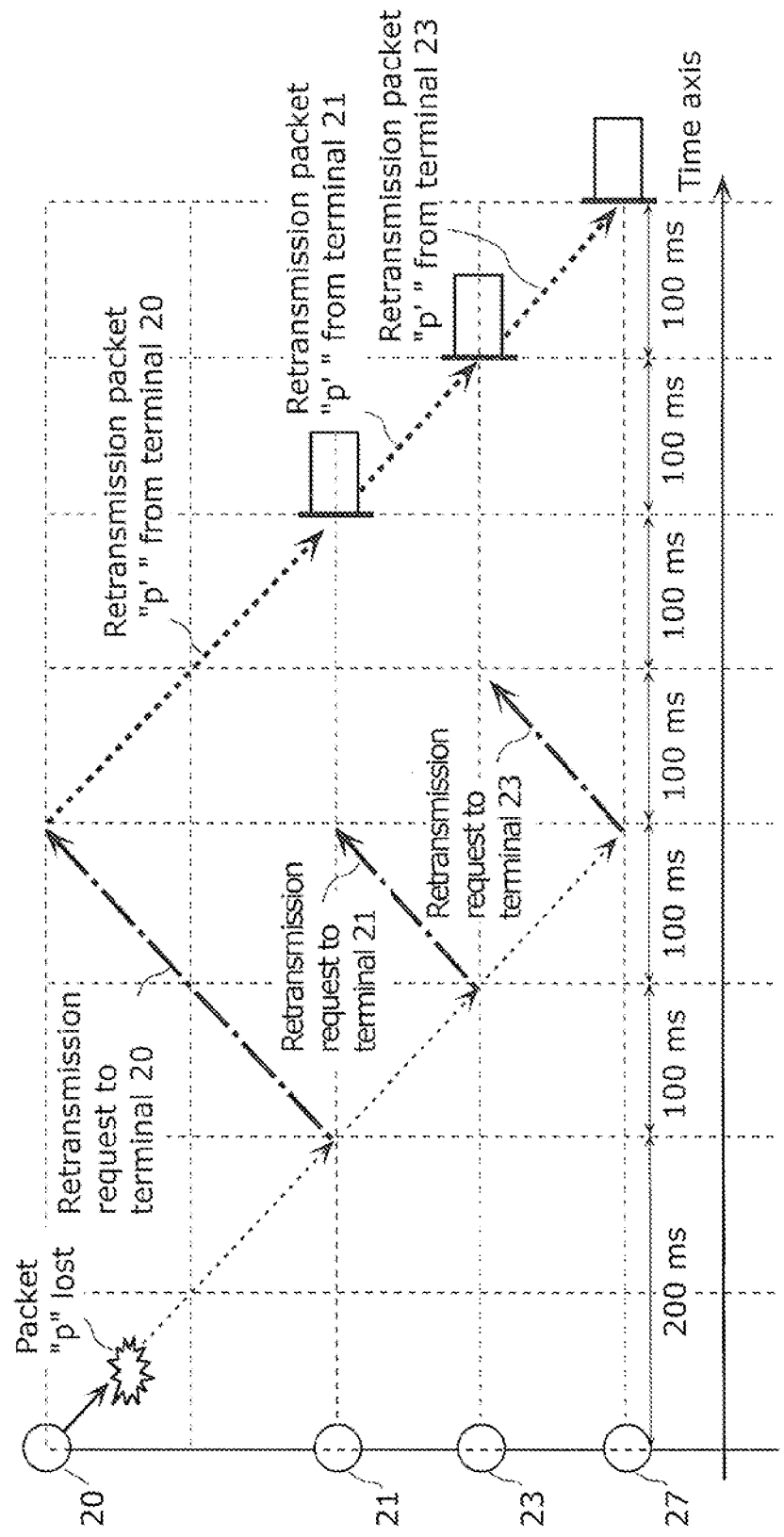
FIG. 22 shows a typical diagram exemplifying a retransmission processing flow under an environment having unequal delay.

FIGS. 11A to 11C show how a computer system executes the communications methods according to Embodiments 1 and 2 using a flexible disk floppy disk (FD) which stores the methods.

FIG. 11A shows a physical format of a magnetic disk used as a storage medium body. FIG. 11B shows a magnetic disk MD, and an elevated view and a cross-sectional view of a casing F holding the magnetic disk MD. FIG. 11C shows how a program is stored on a flexible disk and is reproduced.

The flexible disk FD includes the magnetic disk MD; namely a storage medium body, and the casing F holding the magnetic disk MD. The surface of the magnetic disk MD has tracks Tr concentrically formed from the outer periphery to the inner periphery. Each of the tracks Tr are circumferentially divided into 16 sectors Se. Hence, the flexible disk FD with the above program stores, in an area assigned on the magnetic disk MD, the communications method in a form of the above program.

When the above program is to be stored in the flexible disk FD, the communications method in a form of the above program is provided from a computer system Cs and written on the flexible disk FD via a flexible disk drive FDD. When the communications method is to be constructed in the computer system Cs using the program in the flexible disk FD, the flexible disk drive FDD reads the program from the flexible disk FD, and transfers the read program to the computer system Cs.

It is noted that, in the above description, the flexible disk FD is used as a storage medium; concurrently, an optical disk may also be used. In addition, a flexible disk and an optical disk shall not be limited as a storage medium; instead, any given program-storable medium, such as an integrated circuit (IC) card and a read-only memory (ROM) cartridge, may be used.

Furthermore, the present invention may have some or all of the constituent features of the communications apparatus integrated into one single system large scale integration (LSI). A system LSI is an ultra-multifunctional LSI having constituent units integrated on one single chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention is useful for video distribution and a distance lecture system through an ALM tree.

REFERENCE SIGNS LIST

10 Communications network
11. to 17. and 20. to 32. Terminal
100 Communications terminal
101 Retransmission request retransmitting unit
201 Retransmission data transmitting unit
301 ALM control unit
401 and 1010 Reproduction delay time determining unit
402 RTT managing unit
501 RTT measuring unit
1020 Reproduction control unit

The invention claimed is:

1. A communications terminal included among communications terminals each of which receives stream data distributed from a root terminal and reproduces the stream data, the communications terminals having one parent terminal and child terminals, such that the communication terminals form an Application Layer Multicast (ALM) tree to sequentially transmit retransmission data of the stream data from the parent terminal to the child terminals, and the communications terminal comprising:

a reproduction delay time determining unit configured to select a longest round-trip delay time from among round-trip delay times for sections between the root terminal and the communications terminals, and determine a reproduction delay time based on the longest round-trip delay time selected, each of the round-trip delay times being a time required for transmission and reception of data through one of the sections, each section being between two neighboring terminals among the communications terminals on the ALM tree; and a reproduction control unit configured to reproduce the stream data received from the root terminal delayed by the reproduction delay time determined by the reproduction delay time determining unit.

2. The communications terminal according to claim 1, wherein the reproduction delay time determining unit is configured to determine, as the reproduction delay time, an integral multiple of the longest round-trip delay time.

3. The communications terminal according to claim 1, wherein when a round-trip delay time between the communications terminal and the parent terminal is defined as rtt(self), the reproduction delay time of the communications terminal is defined as x(self), the reproduction delay time of the parent terminal is defined as x(parent), and a positive integer is defined as $\alpha_{self}$, the reproduction delay time determining unit determines (i) the reproduction delay time x(self) by means of Expression 1 if rtt(self)≥x(parent) is satisfied and (ii) the reproduction delay time by means of Expression 2 if rtt(self)<x(parent) is satisfied:

$$X(\text{self}) = \alpha_{self} \times rtt(\text{self}); \text{ and} \quad \text{(Expression 1)}$$

$$X(\text{self}) = (\alpha_{self} - 1) \times rtt(\text{self}) + x(\text{parent}) \quad \text{(Expression 2)}.$$

4. The communications terminal according to claim 1, further comprising
a retransmission requesting unit configured to, in the case where part of the stream data received from the root terminal is lost, request the parent terminal to transmit retransmission data corresponding to the loss,
wherein the retransmission request unit is configured to repeatedly request the parent terminal to transmit the retransmission data at an interval which is (i) equal to or longer than the round-trip delay time between the communications terminal and the parent terminal and (ii) equal to or shorter than the longest round-trip delay time.

5. The communications terminal according to claim 1, further comprising:
a round-trip delay time measuring unit configured to measure the round-trip delay time between the communications terminal and the parent terminal; and
a round-trip delay time managing unit configured to (i) receive, from the parent terminal, a round-trip delay time notification including one or more of the round-trip delay times between the root terminal and the parent terminal on the ALM tree and (ii) transmit, to the child terminal, the received round-trip delay time notification together with the round-trip delay time measured by the round-trip delay time measuring unit.

6. The communications terminal according to claim 5,
wherein the round-trip delay time managing unit is configured to receive the round-trip delay time notification at predetermined time intervals,
the round-trip delay time measuring unit is configured to measure the round-trip delay time between the communications terminal and the parent terminal at each reception of the round-trip delay time notification, and
at each reception of the round-trip delay time notification, the reproduction delay time determining unit is configured to determine the reproduction delay time based on the one or more round-trip delay times included in the round-trip delay time notification and the round-trip delay time measured by the round-trip delay time measuring unit.

7. A communications terminal included among communications terminals each of which receives stream data distributed from a root terminal and reproduces the stream data,
the communications terminals having one parent terminal and child terminals, such that the communication terminals form an ALM tree to sequentially transmit retransmission data of the stream data from the parent terminal to the child terminals, and the communications terminal comprising:
a reproduction delay time determining unit configured to select a longest round-trip delay time of a section, among sections between the root terminal and the communications terminals, having a greatest loss rate of the stream data, and determine a reproduction delay time based on the longest round-trip delay time selected, each of round-trip delay times being a time required for transmission and reception of data through one of the sections, each section being between two neighboring terminals of the communications terminals on the ALM tree; and a reproduction control unit configured to reproduce the stream data delayed by the reproduction delay time determined by the reproduction delay time determining unit.

8. The communications terminal according to claim 7, further comprising:
a loss rate measuring unit configured to measure the loss rate between the communications terminal and the parent terminal; and
a loss rate managing unit configured to (i) receive, from the parent terminal, a loss rate notification including one or more loss rates between the root terminal and the parent terminal on the ALM tree and (ii) transmit, to the child terminal, the loss rate notification together with the loss late measured by the loss rate measuring unit.

9. The communications terminal according to claim 8,
wherein the loss rate managing unit is configured to receive the loss rate notification at predetermined time intervals,
the loss rate measuring unit is configured to measure the loss rate between the communications terminal and the parent terminal at each reception of the loss rate notification, and
at each reception of the loss rate notification, the reproduction delay time determining unit is configured to determine the reproduction delay time based on the one or more loss rates included in the loss rate notification and the loss rate measured by the loss rate measuring unit.

10. A communications method executed by a communications terminal included among communications terminals each of which receives stream data distributed from a root terminal and reproduces the stream data,
the communications terminals having one parent terminal and child terminals, such that the communication terminals form an ALM tree to sequentially transmit retransmission data of the stream data from the parent terminal to the child terminals, and the communications method comprising:
selecting a longest round-trip delay time from among round-trip delay times for sections between the root terminal and the communications terminals, and determine a reproduction delay time based on the longest round-trip delay time selected, each of the round-trip delay times being a time required for transmission and reception of data through one of the sections, each section being between two neighboring terminals among the communications terminals on the ALM tree; and
reproducing the stream data received from the root terminal delayed by the reproduction delay time determined in the selecting the longest round-trip delay time.

11. A program stored on a non-transitory computer-readable recording medium and executed by a communications terminal included among communications terminals each of which receives stream data distributed from a root terminal and reproduces the stream data,
the communications terminals having one parent terminal and child terminals, such that the communication terminals form an ALM tree to sequentially transmit retransmission data of the stream data from the parent terminal to the child terminals, and the program causing the communications terminal to execute steps comprising:
selecting a longest round-trip delay time from among round-trip delay times for sections between the root terminal and the communications terminals, and determine a reproduction delay time based on the longest round-trip delay time selected, each of the round-trip delay times being a time required for transmission and reception of data through one of the sections, each section being between two neighboring terminals among the communications terminals on the ALM tree; and reproducing the stream data received from the root terminal delayed by the reproduction delay time determined in the determining.

12. An integrated circuit in a communications terminal included among communications terminals each of which receives stream data distributed from a root terminal and reproduces the stream data, the communications terminals having one parent terminal and child terminals, such that the communication terminals form an ALM tree to sequentially transmit retransmission data of the stream data from the parent terminal to the child terminals, and the integrated circuit comprising:

a reproduction delay time determining unit configured to select a longest round-trip delay time from among round-trip delay times for sections between the root terminal and the communications terminals, and determine a reproduction delay time based on the longest round-trip delay time selected, each of the round-trip delay times being a time required for transmission and reception of data through one of the sections, each section being between two neighboring terminals among the communications terminals on the ALM tree; and a reproduction control unit configured to reproduce the stream data received from the root terminal delayed by the reproduction delay time determined by the reproduction delay time determining unit.

* * * * *